United States Patent
Lastinger et al.

(10) Patent No.: US 9,496,931 B2
(45) Date of Patent: *Nov. 15, 2016

(54) METHODS AND APPARATUS FOR OVERLAPPING MIMO PHYSICAL SECTORS

(71) Applicant: Woodbury Wireless LLC, Pflugerville, TX (US)

(72) Inventors: Roc Lastinger, Cave Creek, AZ (US); John Spenik, Scottsdale, AZ (US); Brian C. Woodbury, Gilbert, AZ (US)

(73) Assignee: Woodbury Wireless, LLC, Pfugerville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,867

(22) Filed: Nov. 25, 2015

(65) Prior Publication Data

US 2016/0080049 A1    Mar. 17, 2016

Related U.S. Application Data

(63) Continuation of application No. 14/476,628, filed on Sep. 3, 2014, which is a continuation of application No. 13/348,523, filed on Jan. 11, 2012, now Pat. No. 8,855,089, which is a continuation of application No.
(Continued)

(51) Int. Cl.
*H04W 4/00* (2009.01)
*H04B 7/04* (2006.01)
(Continued)

(52) U.S. Cl.
CPC ............ *H04B 7/0413* (2013.01); *H04B 7/024* (2013.01); *H04B 7/0495* (2013.01); *H04B 17/15* (2015.01)

(58) Field of Classification Search
CPC .... H04W 84/12; H04W 84/18; H04W 80/04
USPC .............. 370/338, 328; 455/422.1, 424, 443, 455/452.2
See application file for complete search history.

(56) References Cited

U.S. PATENT DOCUMENTS

| 2,272,312 A | 2/1942 | Tunick |
| 3,317,912 A | 5/1967 | Kelleher |

(Continued)

FOREIGN PATENT DOCUMENTS

| EP | 0022991 A1 | 1/1981 |
| EP | 0435283 A1 | 7/1991 |

(Continued)

OTHER PUBLICATIONS

Blum et al., "On the Capacity of Cellular Systems with MIMO," proc. 2001 Fall IEEE Vehicuar Technology Conf., vol. 2, pp. 1220-1224, Atlantic City, NJ, Oct. 2001.
(Continued)

*Primary Examiner* — Nghi H Ly

(57) ABSTRACT

A method is provided comprising: providing access to a single wireless cell configured to operate in a packet-switched cellular network, the single wireless cell including: a first transmission point with a multiple-input-multiple-output (MIMO) capability; and a second transmission point with a MIMO capability; cooperating with a MIMO-capable portable wireless device; receiving first information from the first MIMO-capable portable wireless device that is based on the measurement of the first interference; receiving second information from the first MIMO-capable portable wireless device that is based on the measurement of the second interference; altering at least one aspect of a first transmission; and transmitting data during the first transmission to the first MIMO-capable portable wireless device, utilizing at least one of: the multiple first directional antennas of the first transmission point with the MIMO capability, or the multiple second directional antennas of the second transmission point with the MIMO capability.

20 Claims, 8 Drawing Sheets

Related U.S. Application Data

13/118,386, filed on May 28, 2011, now Pat. No. 8,345,651, which is a continuation of application No. 11/709,431, filed on Feb. 21, 2007, now Pat. No. 8,009,646.

(60) Provisional application No. 60/743,376, filed on Feb. 28, 2006.

(51) Int. Cl.
*H04B 7/02* (2006.01)
*H04B 17/15* (2015.01)

(56) References Cited

U.S. PATENT DOCUMENTS

| | | | |
|---|---|---|---|
| 3,681,770 A | 8/1972 | Alford |
| 3,803,625 A | 4/1974 | Nemit |
| 4,101,901 A | 7/1978 | Kommrusch |
| 4,128,740 A | 12/1978 | Graziano |
| 4,144,496 A | 3/1979 | Cunningham et al. |
| 4,475,010 A | 10/1984 | Huensch et al. |
| 4,736,453 A | 4/1988 | Schloemer |
| 4,825,222 A | 4/1989 | Butcher |
| 4,829,554 A | 5/1989 | Barnes et al. |
| 5,113,525 A | 5/1992 | Andoh |
| 5,134,709 A | 7/1992 | Bi et al. |
| 5,161,249 A | 11/1992 | Meche et al. |
| 5,212,930 A | 5/1993 | Raudat |
| 5,265,263 A | 11/1993 | Ramsdale et al. |
| 5,276,907 A | 1/1994 | Meidan |
| 5,307,507 A | 4/1994 | Kanai |
| 5,365,571 A | 11/1994 | Rha et al. |
| 5,396,649 A | 3/1995 | Hamabe |
| 5,404,574 A | 4/1995 | Benveniste |
| 5,448,761 A | 9/1995 | Ushirokawa |
| 5,475,864 A | 12/1995 | Hamabe |
| 5,491,833 A | 2/1996 | Hamabe |
| 5,491,837 A | 2/1996 | Haartsen |
| 5,507,008 A | 4/1996 | Kanai et al. |
| 5,548,813 A | 8/1996 | Charas et al. |
| 5,574,977 A | 11/1996 | Joseph et al. |
| 5,590,399 A | 12/1996 | Matsumoto et al. |
| 5,603,082 A | 2/1997 | Hamabe |
| 5,606,727 A | 2/1997 | Ueda |
| 5,613,200 A | 3/1997 | Hamabe |
| 5,649,292 A | 7/1997 | Doner |
| 5,684,491 A | 11/1997 | Newman et al. |
| 5,697,059 A | 12/1997 | Carney |
| 5,722,043 A | 2/1998 | Rappaport et al. |
| 5,726,978 A | 3/1998 | Frodigh et al. |
| 5,732,353 A | 3/1998 | Haartsen |
| 5,740,536 A | 4/1998 | Benveniste |
| 5,771,449 A | 6/1998 | Blasing et al. |
| 5,771,454 A | 6/1998 | Ohsawa |
| 5,787,352 A | 7/1998 | Benveniste |
| 5,790,551 A | 8/1998 | Chan |
| 5,809,423 A | 9/1998 | Benveniste |
| 5,818,385 A | 10/1998 | Bartholomew |
| 5,828,948 A | 10/1998 | Almgren et al. |
| 5,835,859 A | 11/1998 | Doner |
| 5,887,263 A | 3/1999 | Ishii |
| 5,896,573 A | 4/1999 | Yang et al. |
| 5,901,356 A | 5/1999 | Hudson |
| 5,926,763 A | 7/1999 | Greene, Sr. et al. |
| 5,956,643 A | 9/1999 | Benveniste |
| 5,960,349 A | 9/1999 | Chheda et al. |
| 5,963,865 A | 10/1999 | Desgagne et al. |
| 5,969,689 A | 10/1999 | Martek et al. |
| 5,974,327 A | 10/1999 | Agrawal et al. |
| 6,002,934 A | 12/1999 | Boyer et al. |
| 6,009,332 A | 12/1999 | Haartsen |
| 6,023,459 A | 2/2000 | Clark et al. |
| 6,047,175 A | 4/2000 | Trompower |
| 6,047,187 A | 4/2000 | Haartsen |
| 6,047,189 A | 4/2000 | Yun et al. |
| 6,055,230 A | 4/2000 | Feuerstein et al. |
| 6,069,591 A | 5/2000 | Smith |
| 6,070,090 A | 5/2000 | Feuerstein |
| 6,091,954 A | 7/2000 | Haartsen et al. |
| 6,095,820 A | 8/2000 | Luxon et al. |
| 6,104,935 A | 8/2000 | Smith et al. |
| 6,108,321 A | 8/2000 | Anderson et al. |
| 6,112,092 A | 8/2000 | Benveniste |
| 6,118,767 A | 9/2000 | Shen et al. |
| 6,119,011 A | 9/2000 | Borst et al. |
| 6,128,497 A | 10/2000 | Faruque |
| 6,128,498 A | 10/2000 | Benveniste |
| 6,134,442 A | 10/2000 | Borst et al. |
| 6,138,024 A | 10/2000 | Evans et al. |
| 6,154,654 A | 11/2000 | Mao |
| 6,154,655 A | 11/2000 | Borst et al. |
| 6,178,328 B1 | 1/2001 | Tang et al. |
| 6,181,918 B1 | 1/2001 | Benveniste |
| 6,219,541 B1 | 4/2001 | Brodie |
| 6,219,554 B1 | 4/2001 | Eswara et al. |
| 6,229,486 B1 | 5/2001 | Krile |
| 6,230,016 B1 | 5/2001 | Benveniste |
| 6,243,584 B1 | 6/2001 | O'Byrne |
| 6,246,674 B1 | 6/2001 | Feuerstein et al. |
| 6,249,256 B1 | 6/2001 | Luxon et al. |
| 6,259,685 B1 | 7/2001 | Rinne et al. |
| 6,266,527 B1 | 7/2001 | Mintz |
| 6,272,337 B1 | 8/2001 | Mount et al. |
| 6,272,348 B1 | 8/2001 | Saario et al. |
| 6,278,723 B1 | 8/2001 | Meihofer et al. |
| 6,295,453 B1 | 9/2001 | Desgagne et al. |
| 6,304,762 B1 | 10/2001 | Myers et al. |
| 6,317,598 B1 | 11/2001 | Wiesen et al. |
| 6,330,429 B1 | 12/2001 | He |
| 6,334,057 B1 | 12/2001 | Malmgren et al. |
| 6,351,643 B1 | 2/2002 | Haartsen |
| 6,360,107 B1 | 3/2002 | Lin et al. |
| 6,388,999 B1 | 5/2002 | Gorsuch et al. |
| 6,400,697 B1 | 6/2002 | Leung et al. |
| 6,400,704 B2 | 6/2002 | Mikuni et al. |
| 6,400,955 B1 | 6/2002 | Kawabata et al. |
| 6,405,043 B1 | 6/2002 | Jensen et al. |
| 6,405,058 B2 | 6/2002 | Bobier |
| 6,418,316 B2 | 7/2002 | Hildebrand et al. |
| 6,421,542 B1 | 7/2002 | Sandler et al. |
| 6,438,386 B2 | 8/2002 | Joshi et al. |
| 6,459,901 B1 | 10/2002 | Chawla et al. |
| 6,463,301 B1 | 10/2002 | Bevan et al. |
| 6,470,183 B1 | 10/2002 | Herrig |
| 6,470,195 B1 | 10/2002 | Meyer |
| 6,473,467 B1 | 10/2002 | Wallace et al. |
| 6,480,558 B1 | 11/2002 | Ottosson et al. |
| 6,486,832 B1 | 11/2002 | Abramov et al. |
| 6,487,414 B1 | 11/2002 | Tanay et al. |
| 6,493,331 B1 | 12/2002 | Walton et al. |
| 6,496,490 B1 | 12/2002 | Andrews et al. |
| 6,497,599 B1 | 12/2002 | Johnson et al. |
| 6,505,045 B1 | 1/2003 | Hills et al. |
| 6,507,568 B2 | 1/2003 | Kumar et al. |
| 6,519,240 B1 | 2/2003 | Dillinger et al. |
| 6,522,885 B1 | 2/2003 | Tang et al. |
| 6,531,985 B1 | 3/2003 | Jones et al. |
| 6,539,203 B1 | 3/2003 | Herrig |
| 6,542,485 B1 | 4/2003 | Mujtaba |
| 6,542,736 B1 | 4/2003 | Parkvall et al. |
| 6,549,169 B1 | 4/2003 | Matsuyoshi et al. |
| 6,560,443 B1 | 5/2003 | Vaisanen et al. |
| 6,580,912 B2 | 6/2003 | Leung et al. |
| 6,591,108 B1 | 7/2003 | Herrig |
| 6,597,920 B2 | 7/2003 | Yegani et al. |
| 6,597,927 B1 | 7/2003 | Eswara et al. |
| 6,606,499 B1 | 8/2003 | Verrier et al. |
| 6,615,047 B1 | 9/2003 | Yasooka et al. |
| 6,650,655 B2 | 11/2003 | Alvesalo et al. |
| 6,654,612 B1 | 11/2003 | Avidor et al. |
| 6,690,657 B1 | 2/2004 | Lau et al. |
| 6,693,510 B1 | 2/2004 | Yamaguchi |
| 6,697,626 B1 | 2/2004 | Eidson et al. |
| 6,708,036 B2 | 3/2004 | Proctor et al. |

(56) References Cited

U.S. PATENT DOCUMENTS

| | | |
|---|---|---|
| 6,728,544 B1 | 4/2004 | Boyer et al. |
| 6,738,599 B2 | 5/2004 | Black et al. |
| 6,741,837 B1 | 5/2004 | Nakano et al. |
| 6,744,743 B2 | 6/2004 | Walton et al. |
| 6,748,218 B1 | 6/2004 | Johnson et al. |
| 6,774,864 B2 | 8/2004 | Evans et al. |
| 6,795,409 B1 | 9/2004 | Youssefmir et al. |
| 6,842,632 B2 | 1/2005 | Raghothaman et al. |
| 6,870,515 B2 | 3/2005 | Kitchener et al. |
| 6,871,073 B1 | 3/2005 | Boyer et al. |
| 6,889,047 B2 | 5/2005 | Ishida |
| 6,898,431 B1 | 5/2005 | Peele |
| 6,906,674 B2 | 6/2005 | McKinzie, III et al. |
| 6,914,577 B2 | 7/2005 | McCandless |
| 6,930,991 B2 | 8/2005 | Ozluturk |
| 6,940,845 B2 | 9/2005 | Benveniste |
| 6,952,454 B1 | 10/2005 | Jalali et al. |
| 6,975,666 B2 | 12/2005 | Affes et al. |
| 6,999,772 B2 | 2/2006 | Song et al. |
| 7,006,464 B1 | 2/2006 | Gopalakrishnan et al. |
| 7,010,015 B2 | 3/2006 | Hervey, Jr. et al. |
| 7,039,441 B1 | 5/2006 | Reudink et al. |
| 7,042,856 B2 | 5/2006 | Walton et al. |
| 7,042,858 B1 | 5/2006 | Ma et al. |
| 7,047,473 B2 | 5/2006 | Hwang et al. |
| 7,050,812 B2 | 5/2006 | Boyer et al. |
| 7,069,009 B2 | 6/2006 | Li et al. |
| 7,085,572 B2 | 8/2006 | Ishida |
| 7,085,579 B2 | 8/2006 | Mizutani et al. |
| 7,095,709 B2 | 8/2006 | Walton et al. |
| 7,103,325 B1 | 9/2006 | Jia et al. |
| 7,120,395 B2 | 10/2006 | Tong et al. |
| 7,130,636 B2 | 10/2006 | Kitazawa et al. |
| 7,133,380 B1 | 11/2006 | Winters et al. |
| 7,136,654 B1 | 11/2006 | Hogberg et al. |
| 7,145,880 B2 | 12/2006 | Saxena et al. |
| 7,149,239 B2 | 12/2006 | Hudson |
| 7,149,255 B2 | 12/2006 | Chenu-Tournier et al. |
| 7,167,690 B2 | 1/2007 | Baker et al. |
| 7,171,248 B1 | 1/2007 | Brown |
| 7,177,298 B2 | 2/2007 | Chillariga et al. |
| 7,180,877 B1 | 2/2007 | Benveniste |
| 7,181,258 B2 | 2/2007 | Lin et al. |
| 7,184,772 B2 | 2/2007 | Lim et al. |
| 7,187,933 B2 | 3/2007 | Song et al. |
| 7,193,562 B2 | 3/2007 | Shtrom et al. |
| 7,194,017 B2 | 3/2007 | Hervey, Jr. et al. |
| 7,200,405 B2 | 4/2007 | Rudolf et al. |
| 7,202,824 B1 | 4/2007 | Sanelli et al. |
| 7,212,822 B1 | 5/2007 | Vicharelli et al. |
| 7,216,267 B2 | 5/2007 | Santraine et al. |
| 7,224,977 B2 | 5/2007 | Cavalli et al. |
| 7,233,810 B2 | 6/2007 | Medlock et al. |
| 7,257,376 B2 | 8/2007 | Reudink |
| 7,274,944 B2 | 9/2007 | Lastinger et al. |
| 7,280,467 B2 | 10/2007 | Smee et al. |
| 7,280,829 B2 | 10/2007 | Rudolf |
| 7,292,198 B2 | 11/2007 | Shtrom et al. |
| 7,302,278 B2 | 11/2007 | Lastinger et al. |
| 7,305,246 B2 | 12/2007 | Lastinger et al. |
| 7,308,270 B2 | 12/2007 | Lastinger et al. |
| 7,315,533 B2 | 1/2008 | Theobold et al. |
| 7,317,750 B2 | 1/2008 | Shattil |
| 7,336,930 B2 | 2/2008 | Larsson et al. |
| 7,336,956 B2 | 2/2008 | Halonen et al. |
| 7,348,930 B2 | 3/2008 | Lastinger et al. |
| 7,349,480 B2 | 3/2008 | Tsatsanis et al. |
| 7,349,496 B2 | 3/2008 | Jia et al. |
| 7,349,701 B2 | 3/2008 | Lastinger et al. |
| 7,358,912 B1 | 4/2008 | Kish et al. |
| 7,359,675 B2 | 4/2008 | Lastinger et al. |
| 7,362,280 B2 | 4/2008 | Shtrom et al. |
| 7,366,178 B2 | 4/2008 | Lee et al. |
| 7,373,151 B1 | 5/2008 | Ahmed |
| 7,373,176 B2 | 5/2008 | Chotkowski et al. |
| 7,382,840 B2 | 6/2008 | Molisch et al. |
| 7,386,036 B2 | 6/2008 | Pasanen et al. |
| 7,392,014 B2 | 6/2008 | Baker et al. |
| 7,394,860 B2 | 7/2008 | Tong et al. |
| 7,397,864 B2 | 7/2008 | Tarokh et al. |
| 7,400,860 B2 | 7/2008 | Lastinger et al. |
| 7,403,541 B2 | 7/2008 | Yi et al. |
| 7,415,288 B1 * | 8/2008 | Hou .................. H04B 7/0491 370/334 |
| 7,418,273 B2 | 8/2008 | Tomoe et al. |
| 7,424,298 B2 | 9/2008 | Lastinger et al. |
| 7,428,269 B2 | 9/2008 | Sampath et al. |
| 7,430,257 B1 | 9/2008 | Shattil |
| 7,466,985 B1 | 12/2008 | Handforth et al. |
| 7,469,024 B2 | 12/2008 | Khayrallah et al. |
| 7,489,282 B2 | 2/2009 | Lastinger et al. |
| 7,496,147 B2 | 2/2009 | Baier et al. |
| 7,498,996 B2 | 3/2009 | Shtrom et al. |
| 7,498,999 B2 | 3/2009 | Shtrom |
| 7,511,680 B2 | 3/2009 | Shtrom et al. |
| 7,512,403 B2 | 3/2009 | Rajkotia et al. |
| 7,522,515 B2 | 4/2009 | Tsatsanis et al. |
| 7,522,526 B2 | 4/2009 | Yi et al. |
| 7,522,552 B2 | 4/2009 | Fein et al. |
| 7,525,486 B2 | 4/2009 | Shtrom et al. |
| 7,535,866 B2 | 5/2009 | Kimble et al. |
| 7,548,506 B2 | 6/2009 | Ma et al. |
| 7,548,752 B2 | 6/2009 | Sampath et al. |
| 7,590,064 B1 | 9/2009 | Zhang et al. |
| 7,594,010 B2 | 9/2009 | Dohler et al. |
| 7,594,151 B2 | 9/2009 | Sutivong et al. |
| 7,595,756 B2 | 9/2009 | Lastinger et al. |
| 7,599,699 B2 | 10/2009 | Lastinger et al. |
| 7,609,790 B2 | 10/2009 | Shah |
| 7,616,959 B2 | 11/2009 | Spenik et al. |
| 7,636,573 B2 | 12/2009 | Walton et al. |
| 7,639,106 B2 | 12/2009 | Shtrom |
| 7,646,343 B2 | 1/2010 | Shtrom et al. |
| 7,652,632 B2 | 1/2010 | Shtrom |
| 7,653,083 B2 | 1/2010 | Liu et al. |
| 7,664,193 B2 | 2/2010 | Jalali et al. |
| 7,664,195 B2 | 2/2010 | Chenu-Tournier et al. |
| 7,675,474 B2 | 3/2010 | Shtrom et al. |
| 7,680,211 B1 | 3/2010 | von der Embse |
| 7,706,477 B2 | 4/2010 | Larsson |
| 7,733,974 B2 | 6/2010 | Chen |
| 7,746,800 B2 | 6/2010 | Raghothaman et al. |
| 7,751,492 B2 | 7/2010 | Jalali et al. |
| 7,768,979 B2 | 8/2010 | Sutivong et al. |
| 7,769,078 B2 | 8/2010 | Cairns et al. |
| 7,773,578 B2 | 8/2010 | Liu |
| 7,773,961 B2 | 8/2010 | Ding et al. |
| 7,796,544 B2 | 9/2010 | Hench |
| 7,808,937 B2 | 10/2010 | McCloud et al. |
| 7,809,073 B2 | 10/2010 | Liu |
| 7,813,441 B2 | 10/2010 | Jalali et al. |
| 7,817,603 B2 | 10/2010 | Liu |
| 7,822,386 B2 | 10/2010 | Lastinger et al. |
| 7,860,502 B2 | 12/2010 | Kim et al. |
| 7,864,735 B2 | 1/2011 | Ma et al. |
| 7,873,319 B2 | 1/2011 | Lastinger et al. |
| 7,876,838 B2 | 1/2011 | Clarkson et al. |
| 7,876,840 B2 | 1/2011 | Tong et al. |
| 7,880,683 B2 | 2/2011 | Shtrom et al. |
| 7,893,882 B2 | 2/2011 | Shtrom |
| 7,899,497 B2 | 3/2011 | Kish et al. |
| 7,912,012 B2 | 3/2011 | Ma et al. |
| 7,924,879 B2 | 4/2011 | Yi et al. |
| 7,924,949 B2 | 4/2011 | Larsson |
| 7,929,921 B2 | 4/2011 | Love et al. |
| 7,961,696 B2 | 6/2011 | Ma et al. |
| 7,962,826 B2 | 6/2011 | Sutivong et al. |
| 7,965,252 B2 | 6/2011 | Shtrom et al. |
| 7,978,608 B2 | 7/2011 | Yi et al. |
| 7,979,072 B2 | 7/2011 | Senarath et al. |
| 7,990,841 B2 | 8/2011 | Walton et al. |
| 7,995,512 B2 | 8/2011 | Kim et al. |
| 8,005,128 B1 | 8/2011 | Lamba et al. |
| 8,009,646 B2 | 8/2011 | Lastinger et al. |

(56) References Cited

U.S. PATENT DOCUMENTS

| | | |
|---|---|---|
| 8,018,904 B2 | 9/2011 | Hamalainen et al. |
| 8,018,975 B2 | 9/2011 | Ma et al. |
| 8,023,466 B2 | 9/2011 | Ma et al. |
| 8,036,129 B2 | 10/2011 | Yi et al. |
| 8,045,988 B2 | 10/2011 | Sutivong et al. |
| 8,050,178 B2 | 11/2011 | Yi et al. |
| 8,085,814 B2 | 12/2011 | Ma et al. |
| 8,090,006 B2 | 1/2012 | Narayan et al. |
| 8,098,683 B2 | 1/2012 | Kent et al. |
| 8,111,678 B2 | 2/2012 | Lastinger et al. |
| 8,121,177 B2 | 2/2012 | Narayan et al. |
| 8,130,854 B2 | 3/2012 | Fischer et al. |
| 8,139,658 B2 | 3/2012 | Tsatsanis et al. |
| 8,165,094 B2 | 4/2012 | Ma et al. |
| 8,194,776 B2 | 6/2012 | Jalali et al. |
| 8,213,292 B2 | 7/2012 | Ma et al. |
| 8,238,342 B2 | 8/2012 | Yi et al. |
| 8,248,993 B2 | 8/2012 | Cai |
| 8,249,024 B2 | 8/2012 | Ma et al. |
| 8,254,259 B2 | 8/2012 | Yi et al. |
| 8,265,675 B2 | 9/2012 | Matsumoto et al. |
| 8,270,383 B2 | 9/2012 | Lastinger et al. |
| 8,279,836 B2 | 10/2012 | Ma et al. |
| 8,289,902 B2 | 10/2012 | Fein et al. |
| 8,295,884 B2 | 10/2012 | Trivedi et al. |
| 8,312,142 B2 | 11/2012 | Rinne et al. |
| 8,325,695 B2 | 12/2012 | Lastinger et al. |
| 8,331,324 B2 | 12/2012 | Ma et al. |
| 8,340,072 B2 | 12/2012 | Ma et al. |
| 8,345,651 B2 | 1/2013 | Lastinger et al. |
| 8,355,321 B2 | 1/2013 | Yi et al. |
| 8,391,338 B2 | 3/2013 | Lamba et al. |
| 8,400,922 B2 | 3/2013 | Yi et al. |
| 8,428,039 B2 | 4/2013 | Lastinger et al. |
| 8,428,636 B2 | 4/2013 | Baker et al. |
| 8,437,760 B2 | 5/2013 | Senarath et al. |
| 8,437,761 B2 | 5/2013 | Senarath et al. |
| 8,441,918 B2 | 5/2013 | Ma et al. |
| 8,442,009 B2 | 5/2013 | Senarath et al. |
| 8,442,051 B2 | 5/2013 | Yi et al. |
| 8,446,879 B2 | 5/2013 | Ma et al. |
| 8,446,892 B2 | 5/2013 | Ji et al. |
| 8,457,263 B2 | 6/2013 | Lamba et al. |
| 8,477,803 B2 | 7/2013 | Kent et al. |
| 8,514,863 B2 | 8/2013 | Yi et al. |
| 8,515,352 B2 | 8/2013 | Medlock et al. |
| 8,537,782 B2 | 9/2013 | Ma et al. |
| 8,547,951 B2 | 10/2013 | Ji et al. |
| 8,571,132 B2 | 10/2013 | Khandekar et al. |
| 8,572,250 B2 | 10/2013 | Rinne et al. |
| 8,582,441 B2 | 11/2013 | Yi et al. |
| 8,594,252 B2 | 11/2013 | Black et al. |
| 8,611,305 B2 | 12/2013 | Black et al. |
| 8,619,713 B2 | 12/2013 | Ma et al. |
| 8,654,648 B2 | 2/2014 | Yi et al. |
| 8,654,689 B2 | 2/2014 | McCloud et al. |
| 8,670,390 B2 | 3/2014 | Shattil |
| 8,675,509 B2 | 3/2014 | Sampath et al. |
| 8,681,684 B2 | 3/2014 | Dohler et al. |
| 8,706,116 B2 | 4/2014 | Tomoe et al. |
| 8,724,480 B2 | 5/2014 | Yi et al. |
| 8,767,885 B2 | 7/2014 | Sampath et al. |
| 8,780,957 B2 | 7/2014 | Kim et al. |
| 8,781,399 B2 | 7/2014 | Medlock et al. |
| 8,830,816 B2 | 9/2014 | Ma et al. |
| 8,842,581 B2 | 9/2014 | Hottinen |
| 8,848,765 B2 | 9/2014 | Lamba et al. |
| 8,855,089 B2 | 10/2014 | Lastinger et al. |
| 8,909,226 B2 | 12/2014 | Zhang et al. |
| 8,942,082 B2 | 1/2015 | Shattil |
| 8,964,912 B2 | 2/2015 | Cairns et al. |
| 8,971,461 B2 | 3/2015 | Sampath et al. |
| 9,025,581 B2 | 5/2015 | Ram et al. |
| 9,036,515 B2 | 5/2015 | Novak et al. |
| 9,049,610 B2 | 6/2015 | Yi et al. |
| 9,055,545 B2 | 6/2015 | Black et al. |
| 9,071,403 B2 | 6/2015 | Novak et al. |
| 9,100,152 B2 | 8/2015 | Papasakellariou |
| 9,100,964 B2 | 8/2015 | Fong et al. |
| 9,136,931 B2 | 9/2015 | Shattil |
| 9,225,471 B2 | 12/2015 | Shattil |
| 2001/0033622 A1 | 10/2001 | Jongren et al. |
| 2001/0046866 A1 | 11/2001 | Wang |
| 2001/0053677 A1 | 12/2001 | Schiffer |
| 2002/0006120 A1 | 1/2002 | Suzuki et al. |
| 2002/0019233 A1 | 2/2002 | Leung et al. |
| 2002/0037729 A1 | 3/2002 | Kitazawa et al. |
| 2002/0039884 A1 | 4/2002 | Raynes et al. |
| 2002/0051433 A1 | 5/2002 | Affes et al. |
| 2002/0062472 A1 | 5/2002 | Medlock et al. |
| 2002/0067309 A1 | 6/2002 | Baker et al. |
| 2002/0077152 A1 | 6/2002 | Johnson et al. |
| 2002/0094834 A1 | 7/2002 | Baker et al. |
| 2002/0119799 A1 | 8/2002 | Moulsley et al. |
| 2002/0137467 A1* | 9/2002 | Tzannes ............ H04L 1/0002 455/69 |
| 2002/0149534 A1 | 10/2002 | Bobier |
| 2002/0154705 A1 | 10/2002 | Walton et al. |
| 2002/0159405 A1 | 10/2002 | Garrison et al. |
| 2002/0168945 A1 | 11/2002 | Hwang et al. |
| 2002/0173302 A1 | 11/2002 | Baker et al. |
| 2002/0193146 A1 | 12/2002 | Wallace et al. |
| 2002/0197984 A1 | 12/2002 | Monin et al. |
| 2003/0002442 A1 | 1/2003 | Flammer et al. |
| 2003/0013451 A1 | 1/2003 | Walton |
| 2003/0043887 A1 | 3/2003 | Hudson |
| 2003/0072255 A1 | 4/2003 | Ma et al. |
| 2003/0087645 A1 | 5/2003 | Kim et al. |
| 2003/0109285 A1 | 6/2003 | Reed et al. |
| 2003/0123425 A1 | 7/2003 | Walton et al. |
| 2003/0125040 A1 | 7/2003 | Walton et al. |
| 2003/0125089 A1 | 7/2003 | Pedersen |
| 2003/0128705 A1 | 7/2003 | Yi et al. |
| 2003/0128770 A1 | 7/2003 | Chenu-Tournier et al. |
| 2003/0131124 A1 | 7/2003 | Yi et al. |
| 2003/0181180 A1 | 9/2003 | Darabi et al. |
| 2003/0184490 A1 | 10/2003 | Raiman et al. |
| 2003/0201937 A1 | 10/2003 | Lee |
| 2003/0210665 A1 | 11/2003 | Salmenkaita et al. |
| 2003/0235146 A1 | 12/2003 | Wu et al. |
| 2003/0235147 A1 | 12/2003 | Walton et al. |
| 2004/0009791 A1 | 1/2004 | Hiramatsu |
| 2004/0057530 A1 | 3/2004 | Tarokh et al. |
| 2004/0066866 A1 | 4/2004 | Tong et al. |
| 2004/0086027 A1 | 5/2004 | Shattil |
| 2004/0086064 A1 | 5/2004 | Van Acker et al. |
| 2004/0106412 A1 | 6/2004 | Laroia et al. |
| 2004/0116146 A1 | 6/2004 | Sadowsky et al. |
| 2004/0121774 A1 | 6/2004 | Rajkotia et al. |
| 2004/0125779 A1 | 7/2004 | Kelton et al. |
| 2004/0127257 A1 | 7/2004 | Raghothaman et al. |
| 2004/0131007 A1 | 7/2004 | Smee et al. |
| 2004/0131025 A1 | 7/2004 | Dohler et al. |
| 2004/0132494 A1 | 7/2004 | Tirkkonen et al. |
| 2004/0150580 A1 | 8/2004 | Gaudette et al. |
| 2004/0174303 A1 | 9/2004 | Duxbury et al. |
| 2004/0183726 A1 | 9/2004 | Theobold |
| 2004/0196834 A1 | 10/2004 | Ofek et al. |
| 2004/0217913 A1 | 11/2004 | McCandless |
| 2004/0224691 A1 | 11/2004 | Hadad |
| 2004/0253955 A1 | 12/2004 | Love et al. |
| 2005/0002323 A1 | 1/2005 | Hadad |
| 2005/0003763 A1 | 1/2005 | Lastinger et al. |
| 2005/0003865 A1 | 1/2005 | Lastinger et al. |
| 2005/0009476 A1 | 1/2005 | Wu et al. |
| 2005/0018789 A1 | 1/2005 | Jia et al. |
| 2005/0025271 A1 | 2/2005 | Molisch et al. |
| 2005/0026616 A1 | 2/2005 | Cavalli et al. |
| 2005/0037766 A1 | 2/2005 | Hans et al. |
| 2005/0047485 A1 | 3/2005 | Khayrallah et al. |
| 2005/0070294 A1 | 3/2005 | Lyle et al. |
| 2005/0075084 A1 | 4/2005 | Salokannel et al. |
| 2005/0078742 A1 | 4/2005 | Cairns et al. |
| 2005/0085195 A1 | 4/2005 | Tong et al. |

(56) References Cited

U.S. PATENT DOCUMENTS

| | | |
|---|---|---|
| 2005/0107091 A1 | 5/2005 | Vannithamby et al. |
| 2005/0111376 A1 | 5/2005 | Raghothaman et al. |
| 2005/0129218 A1 | 6/2005 | Kimble et al. |
| 2005/0141545 A1 | 6/2005 | Fein et al. |
| 2005/0141593 A1 | 6/2005 | Pasanen et al. |
| 2005/0169396 A1 | 8/2005 | Baier et al. |
| 2005/0208949 A1 | 9/2005 | Chiueh |
| 2005/0245270 A1 | 11/2005 | Sartori et al. |
| 2005/0272432 A1 | 12/2005 | Ji et al. |
| 2005/0277400 A1 | 12/2005 | Shah |
| 2005/0277422 A1 | 12/2005 | Baker et al. |
| 2005/0281228 A1 | 12/2005 | Oh et al. |
| 2006/0002346 A1 | 1/2006 | Sutivong et al. |
| 2006/0013285 A1 | 1/2006 | Kobayashi et al. |
| 2006/0023645 A1 | 2/2006 | Hench |
| 2006/0023666 A1 | 2/2006 | Jalali et al. |
| 2006/0038738 A1 | 2/2006 | Shtrom |
| 2006/0056522 A1 | 3/2006 | Tsatsanis et al. |
| 2006/0059410 A1 | 3/2006 | Santraine et al. |
| 2006/0072629 A1 | 4/2006 | Kent et al. |
| 2006/0077935 A1 | 4/2006 | Hamalainen et al. |
| 2006/0088007 A1 | 4/2006 | Jalali et al. |
| 2006/0093067 A1 | 5/2006 | Jalali et al. |
| 2006/0104334 A1 | 5/2006 | Hervey et al. |
| 2006/0121946 A1 | 6/2006 | Walton et al. |
| 2006/0133519 A1 | 6/2006 | Tsatsanis et al. |
| 2006/0135169 A1 | 6/2006 | Sampath et al. |
| 2006/0146760 A1 | 7/2006 | Khandekar et al. |
| 2006/0148484 A1 | 7/2006 | Zhang et al. |
| 2006/0159160 A1 | 7/2006 | Kim et al. |
| 2006/0182063 A1 | 8/2006 | Ma et al. |
| 2006/0192720 A1 | 8/2006 | Shtrom |
| 2006/0193268 A1 | 8/2006 | Walton et al. |
| 2006/0195576 A1 | 8/2006 | Rinne et al. |
| 2006/0198459 A1 | 9/2006 | Fischer et al. |
| 2006/0209754 A1 | 9/2006 | Ji et al. |
| 2006/0215592 A1 | 9/2006 | Tomoe et al. |
| 2006/0217124 A1 | 9/2006 | Bi et al. |
| 2006/0227730 A1 | 10/2006 | McCloud et al. |
| 2006/0229017 A1 | 10/2006 | Larsson et al. |
| 2006/0233277 A1 | 10/2006 | Chen |
| 2006/0234777 A1 | 10/2006 | Vannithamby et al. |
| 2006/0245509 A1 | 11/2006 | Khan et al. |
| 2006/0252436 A1 | 11/2006 | Tirkkonen et al. |
| 2006/0262750 A1 | 11/2006 | Walton et al. |
| 2006/0268962 A1 | 11/2006 | Cairns et al. |
| 2006/0276212 A1 | 12/2006 | Sampath et al. |
| 2006/0291371 A1 | 12/2006 | Sutivong et al. |
| 2007/0010957 A1 | 1/2007 | Sampath et al. |
| 2007/0014387 A1 | 1/2007 | Chenu-Tournier et al. |
| 2007/0025236 A1 | 2/2007 | Ma et al. |
| 2007/0026807 A1 | 2/2007 | Kish |
| 2007/0054621 A1 | 3/2007 | Larsson |
| 2007/0064586 A1 | 3/2007 | Ma et al. |
| 2007/0066362 A1 | 3/2007 | Ma et al. |
| 2007/0070937 A1 | 3/2007 | Demirhan et al. |
| 2007/0070954 A1 | 3/2007 | Kim et al. |
| 2007/0072550 A1 | 3/2007 | Wang |
| 2007/0081448 A1 | 4/2007 | Ahmed et al. |
| 2007/0081455 A1 | 4/2007 | Kashima et al. |
| 2007/0093273 A1 | 4/2007 | Cai |
| 2007/0104165 A1 | 5/2007 | Hanaoka et al. |
| 2007/0105508 A1 | 5/2007 | Tong et al. |
| 2007/0117559 A1 | 5/2007 | Trivedi et al. |
| 2007/0135125 A1 | 6/2007 | Kim et al. |
| 2007/0135166 A1 | 6/2007 | Ding et al. |
| 2007/0160012 A1 | 7/2007 | Liu |
| 2007/0213062 A1 | 9/2007 | Medlock et al. |
| 2007/0249340 A1 | 10/2007 | Hiltunen et al. |
| 2007/0263735 A1 | 11/2007 | Tong et al. |
| 2007/0280370 A1 | 12/2007 | Liu |
| 2007/0297371 A1 | 12/2007 | Lea |
| 2008/0024382 A1 | 1/2008 | Uddin et al. |
| 2008/0039107 A1 | 2/2008 | Ma et al. |
| 2008/0069032 A1 | 3/2008 | Liu |
| 2008/0076432 A1 | 3/2008 | Senarath et al. |
| 2008/0095121 A1 | 4/2008 | Shattil |
| 2008/0125154 A1 | 5/2008 | Zirwas et al. |
| 2008/0192682 A1 | 8/2008 | Matsumoto et al. |
| 2008/0199183 A1 | 8/2008 | Liu et al. |
| 2008/0212588 A1 | 9/2008 | Yi et al. |
| 2008/0253375 A1 | 10/2008 | Yi et al. |
| 2008/0268844 A1 | 10/2008 | Ma et al. |
| 2008/0268848 A1 | 10/2008 | Tomoe et al. |
| 2008/0279125 A1 | 11/2008 | Hottinen |
| 2009/0022066 A1 | 1/2009 | Kish et al. |
| 2009/0022098 A1 | 1/2009 | Novak et al. |
| 2009/0060076 A1 | 3/2009 | Ma et al. |
| 2009/0103494 A1 | 4/2009 | Ma et al. |
| 2009/0129334 A1 | 5/2009 | Ma et al. |
| 2009/0168700 A1 | 7/2009 | Yi et al. |
| 2009/0175222 A1 | 7/2009 | Yi et al. |
| 2009/0180411 A1 | 7/2009 | Yi et al. |
| 2009/0252200 A1 | 10/2009 | Dohler et al. |
| 2009/0274232 A1 | 11/2009 | Sutivong et al. |
| 2009/0305711 A1 | 12/2009 | Rinne et al. |
| 2009/0327546 A1 | 12/2009 | Guri et al. |
| 2010/0002585 A1 | 1/2010 | Yi et al. |
| 2010/0002597 A1 | 1/2010 | Sampath et al. |
| 2010/0002618 A1 | 1/2010 | Eichinger et al. |
| 2010/0020815 A1 | 1/2010 | Yi et al. |
| 2010/0034148 A1 | 2/2010 | Zhang et al. |
| 2010/0040034 A1 | 2/2010 | Shah |
| 2010/0061243 A1 | 3/2010 | Yi et al. |
| 2010/0061496 A1 | 3/2010 | Black et al. |
| 2010/0067505 A1 | 3/2010 | Fein et al. |
| 2010/0098014 A1 | 4/2010 | Larsson |
| 2010/0142479 A1 | 6/2010 | Black et al. |
| 2010/0142638 A1 | 6/2010 | Jalali et al. |
| 2010/0238902 A1 | 9/2010 | Ji et al. |
| 2010/0254354 A1 | 10/2010 | Sutivong et al. |
| 2011/0019608 A1 | 1/2011 | Dohler et al. |
| 2011/0019656 A1 | 1/2011 | McCloud et al. |
| 2011/0064066 A1 | 3/2011 | Lamba et al. |
| 2011/0064172 A1 | 3/2011 | Olson et al. |
| 2011/0069742 A1 | 3/2011 | Narayan et al. |
| 2011/0096751 A1 | 4/2011 | Ma et al. |
| 2011/0149869 A1 | 6/2011 | Yi et al. |
| 2011/0149870 A1 | 6/2011 | Yi et al. |
| 2011/0149997 A1 | 6/2011 | Yi et al. |
| 2011/0206108 A1 | 8/2011 | Tsatsanis et al. |
| 2011/0222504 A1 | 9/2011 | Ma et al. |
| 2011/0228870 A1 | 9/2011 | Lastinger et al. |
| 2011/0230141 A1 | 9/2011 | Lastinger et al. |
| 2011/0235618 A1 | 9/2011 | Senarath et al. |
| 2011/0237262 A1 | 9/2011 | Senarath et al. |
| 2011/0244868 A1 | 10/2011 | Senarath et al. |
| 2011/0281603 A1 | 11/2011 | Lastinger et al. |
| 2011/0292974 A1 | 12/2011 | Lamba et al. |
| 2011/0310725 A1 | 12/2011 | Ma et al. |
| 2011/0310846 A1 | 12/2011 | Ma et al. |
| 2011/0310847 A1 | 12/2011 | Ma et al. |
| 2011/0310848 A1 | 12/2011 | Ma et al. |
| 2011/0310874 A1 | 12/2011 | Lastinger et al. |
| 2012/0027136 A1 | 2/2012 | Ma et al. |
| 2012/0044982 A1 | 2/2012 | Sampath et al. |
| 2012/0082270 A1 | 4/2012 | Kent et al. |
| 2012/0147982 A1 | 6/2012 | Lastinger et al. |
| 2012/0243626 A1 | 9/2012 | Ma et al. |
| 2012/0250787 A1 | 10/2012 | Ma et al. |
| 2012/0281676 A1 | 11/2012 | Ma et al. |
| 2012/0287947 A1 | 11/2012 | Yi et al. |
| 2012/0327905 A1 | 12/2012 | Ma et al. |
| 2013/0003526 A1 | 1/2013 | Novak et al. |
| 2013/0010729 A1 | 1/2013 | Novak et al. |
| 2013/0016603 A1 | 1/2013 | Novak et al. |
| 2013/0022020 A1 | 1/2013 | Novak et al. |
| 2013/0077468 A1 | 3/2013 | Ma et al. |
| 2013/0077469 A1 | 3/2013 | Ma et al. |
| 2013/0148609 A1 | 6/2013 | Ram et al. |
| 2013/0155923 A1 | 6/2013 | Yi et al. |
| 2013/0250858 A1 | 9/2013 | Senarath et al. |
| 2013/0301400 A1 | 11/2013 | Ma et al. |
| 2013/0316666 A1 | 11/2013 | Medlock et al. |

(56) References Cited

U.S. PATENT DOCUMENTS

| | | |
|---|---|---|
| 2013/0322399 A1 | 12/2013 | Ma et al. |
| 2013/0329695 A1 | 12/2013 | Senarath et al. |
| 2014/0003471 A1 | 1/2014 | Lamba et al. |
| 2014/0023046 A1 | 1/2014 | Ma et al. |
| 2014/0036823 A1 | 2/2014 | Ma et al. |
| 2014/0050249 A1 | 2/2014 | Khandekar et al. |
| 2014/0119342 A1 | 5/2014 | Tomoe et al. |
| 2014/0140188 A1 | 5/2014 | Shattil |
| 2014/0140189 A1 | 5/2014 | Shattil |
| 2014/0146916 A1 | 5/2014 | Shattil |
| 2014/0146924 A1 | 5/2014 | Shattil |
| 2014/0187248 A1 | 7/2014 | Black et al. |
| 2014/0226563 A1 | 8/2014 | Yi et al. |
| 2014/0233502 A1 | 8/2014 | Fong et al. |
| 2014/0341323 A1 | 11/2014 | McCloud et al. |
| 2015/0016297 A1 | 1/2015 | Lamba et al. |
| 2015/0065141 A1 | 3/2015 | Ma et al. |
| 2015/0111614 A1 | 4/2015 | Vannithamby et al. |
| 2015/0229573 A1 | 8/2015 | Yi et al. |
| 2015/0244430 A1 | 8/2015 | Shattil |
| 2015/0270882 A1 | 9/2015 | Shattil |

FOREIGN PATENT DOCUMENTS

| | | |
|---|---|---|
| EP | 490554 A2 | 6/1992 |
| EP | 522276 A2 | 1/1993 |
| EP | 571133 A2 | 11/1993 |
| EP | 578197 A2 | 1/1994 |
| EP | 0622925 A1 | 11/1994 |
| EP | 635989 A1 | 1/1995 |
| EP | 06660631 A2 | 6/1995 |
| EP | 0668627 A1 | 8/1995 |
| EP | 0715478 A2 | 6/1996 |
| EP | 0734194 A1 | 9/1996 |
| EP | 0782361 A2 | 7/1997 |
| EP | 0785695 A2 | 7/1997 |
| EP | 802695 A2 | 10/1997 |
| EP | 867096 A1 | 9/1998 |
| EP | 0895436 A2 | 2/1999 |
| EP | 925706 A1 | 6/1999 |
| EP | 0980111 A1 | 2/2000 |
| EP | 0983705 A2 | 3/2000 |
| EP | 1013013 A1 | 6/2000 |
| EP | 1014740 A1 | 6/2000 |
| EP | 1106028 A1 | 6/2001 |
| EP | 1148749 A2 | 10/2001 |
| EP | 1189467 A1 | 3/2002 |
| EP | 1594261 A2 | 11/2005 |
| FR | 27885488 A1 | 5/2000 |
| JP | 57020002 | 2/1982 |
| JP | 2000031721 A | 1/2000 |
| KR | 200235289 | 10/2001 |
| WO | 9842150 A2 | 9/1998 |
| WO | 9952311 A1 | 10/1999 |
| WO | 0101582 A2 | 1/2001 |
| WO | 02073739 A1 | 9/2002 |
| WO | 03003511 A1 | 1/2003 |
| WO | 03023895 A2 | 3/2003 |
| WO | 03043128 A1 | 5/2003 |
| WO | 2005010652 A2 | 2/2005 |
| WO | 2005039225 A1 | 4/2005 |

OTHER PUBLICATIONS

Xiaodong et al., "Handover Mechanism in Coordinated Multi-Point Transmission/Reception System," ZTE Corporate, ZTE Communications, 2010, No. 1.
Catreux et al., "Simulation Results for an interference-limited multiple-input multiple-output cellular system," IEEE Communications Letter, vol. 4, No. 11, pp. 334-336, Nov. 2000.
Dai et al., "Downlink capacity of interference-limited MIMO systems with joint detection," IEEE Transactions Wireless Communications, vol. 3, No. 2, pp. 442-453, Mar. 2004.
Goldsmith et al., "Capacity limits of MIMO Channels," IEEE J Select, Areas Coomun., vol. 21, No. 5, pp. 684-702, Jun. 2003.
Jafar et al., "PhantomNet: Exploring Optimal Multicellular Multiple antenna systems," Proc. 2002 Fall IEEE Vehicular Technology Conf. (VTC), vol. 1. pp. 261-265, Vanvouber, Canada, Sep. 2002.
Spencer et al., "Capacity and downlink transmission algorithms for a multi-user MIMO Channel," Conference record of the Thirty-Second Asilomar Conference on Signals, systems, and Computers, vol. 2, pp. 1384-1388, Nov. 2002.
Wyner, "Shannon-theoretic approach to a Gaussian Cellular Multiple-access channel," IEEE Trans, on Inform. Theory, vol. 40, No. 6, pp. 1713-1727, Nov. 1994.
Shamai et al., "Enhancing the cellular downlink capacity via co-processing at the transmission end," Proc. 2001 Spring IEEE Vehicular Technology Conf., pp. 1745-1749, Rhodes, Greece, May 2001.
Baier et al, "Joint transmission (JT), an alternative rationale for the downlink of Time Division CDMA using multi-clement transmit antennas," pp. 1-5.
Meuer et al, "Joint transmission; advantageous downlink concept for CDMA mobile radio systems using time division duplexing", pp. 900-901, May 2000.
Meuer et al, "Synthesis of joint detection and joint transmission in CDMA downlinks", Electronics Letters, Jul. 5, 2001, vol. 37, No. 14.
Troger et al., "Performance Assessment of Joint Transmission (JT) Multi-User Downlinks and Multi-Element Transmit Antennas", Smart Antennas, vol. 12, No. 5, Sep.-Oct. 2001, pp. 407-416.
Costa, "Writing on Dirty Paper," IEEE Transactions on Information Theory, vol. 29 No. 3, pp. 439-441, May 1983.
Jafar et al., "Transmitter Optimization for miltiple antenna cellular systems," Proc, 2002 IEEE International Syposium on Information Theory, pp. 50, Jun. 30-Jul. 5, 2002.
Molisch, "MIMO systems with antenna selection-an overview," Proc. Radio and Wireless Conference, 2003, RAWCON 03, pp. 167-170 Aug. 2003.
U.S. Appl. No. 14/952,839, filed Nov. 25, 2015.
U.S. Appl. No. 14/952,850, filed Nov. 25, 2015.
U.S. Appl. No. 14/952,874, filed Nov. 25, 2015.
Sharmai and Zaidel, "Enchaning the Cellular Downlink Capacity via Co-Processing at the Transmitting End," IEEE, Jun. 2001, pp. 1745-1749.
U.S. Appl. No. 10/145,854, filed May 14, 2002.
U.S. Appl. No. 60/286,850, filed Apr. 26, 2001.
U.S. Appl. No. 60/598,187, filed Aug. 2, 2004.
Kagoshima, K., "Pattern Control Antennas for Wireless Access Systems," Antennas and Propagation Society International Symposium, 2000, IEEE, Jul. 16, 2000, vol. 2, pp. 574-577.
Non-Final Office Action from U.S. Appl. No. 11/709,431, dated Sep. 22, 2009.
Johnson, R. C., "Antenna Engineering Handbook," McGraw-Hill, pp. 27-8-27-10.
Restriction Requirement from U.S. Appl. No. 11/709,431, dated Apr. 7, 2010.
Nigam, G. et al., "Coordinated Multipoint in Heterogeneous Networks: A Stochastic Geometry Approach," IEEE Globecom Workshops, Dec. 2013, pp. 1-6.
Zhang, H. et all., "Base Station Cooperation for Multiuser MIMO: Joint Transmission and BS Selection," 2004 Conference on Information Sciences and Systems, Mar. 17-19, 2004, pp. 1-6.
Notice of Allowance from U.S. Appl. No. 10/869,201, dated Sep. 27, 2007.
Non-Final Office Action from U.S. Appl. No. 10/869,201, dated Jun. 6, 2007.
Final Office Action from U.S. Appl. No. 10/869,201, dated Jan. 4, 2007.
Non-Final Office Action from U.S. Appl. No. 10/869,201, dated Sep. 7, 2006.
Advisory Action from U.S. Appl. No. 10/869,201, dated Jun. 19, 2006.
Final Office Action from U.S. Appl. No. 10/869,201, dated Apr. 17, 2006.

(56) References Cited

OTHER PUBLICATIONS

Non-Final Office Action from U.S. Appl. No. 10/869,201, dated Nov. 4, 2005.
Final Office Action from U.S. Appl. No. 10/869,201, dated May 20, 2005.
Restriction Requirement from U.S. Appl. No. 10/869,201, dated Jauary 13, 2005.
Notice of Allowance from U.S. Appl. No. 10/880,387, dated Nov. 1, 2007.
Non-Final Office Action from U.S. Appl. No. 10/880,387, dated Jul. 19, 2007.
Restriction Requirement from U.S. Appl. No. 10/880,387, dated Mar. 29, 2007.
Notice of Allowance from U.S. Appl. No. 11/160,549, dated Oct. 15, 2007.
Non-Final Office Action from U.S. Appl. No. 11/160,549, dated Jun. 6, 2007.
Final Office Action from U.S. Appl. No. 11/160,549, dated Jan. 4, 2007.
Non-Final Office Action from U.S. Appl. No. 11/160,549, dated Jul. 26, 2006.
Restriction Requirement from U.S. Appl. No. 11/160,549, dated Jun. 29, 2006.
Notice of Allowance from U.S. Appl. No. 11/160,550, dated Jul. 24, 2007.
Non-Final Office Action from U.S. Appl. No. 11/160,550, dated Dec. 15, 2006.
Advisory Action from U.S. Appl. No. 11/160,550, dated Sep. 21, 2006.
Final Office Action from U.S. Appl. No. 11/160,550, dated Jun. 30, 2006.
Non-Final Office Action from U.S. Appl. No. 11/160,550, dated Mar. 6, 2006.
Notice of Allowance from U.S. Appl. No. 11/160,551, dated Oct. 19, 2007.
Non-Final Office Action from U.S. Appl. No. 11/160,551, dated Jun. 6, 2007.
Final Office Action from U.S. Appl. No. 11/160,551, dated Feb. 9, 2007.
Non-Final Office Action from U.S. Appl. No. 11/160,551, dated Sep. 22, 2006.
Restriction Requirement from U.S. Appl. No. 11/160,551, dated Jun. 29, 2006.
Notice of Allowance from U.S. Appl. No. 11/160,937, dated Nov. 20, 2007.
Restriction Requirement from U.S. Appl. No. 11/160,937, dated Aug. 23, 2007.
Notice of Allowance from U.S. Appl. No. 11/275,605, dated Nov. 19, 2007.
Non-Final Office Action from U.S. Appl. No. 11/275,605, dated Oct. 2, 2007.
Notice of Allowance from U.S. Appl. No. 11/275,619, dated Nov. 24, 2008.
Non-Final Office Action from U.S. Appl. No. 11/275,619, dated Apr. 30, 2008.
Notice of Allowance from U.S. Appl. No. 11/420,605, dated Apr. 2, 2008.
Notice of Allowance from U.S. Appl. No. 11/584,730, dated Aug. 6, 2009.
Ex Parte Quayle from U.S. Appl. No. 11/584,730, dated May 28, 2015.
Notice of Allowance from U.S. Appl. No. 11/586,178, dated Jul. 17, 2009.
Non-Final Office Action from U.S. Appl. No. 11/586,178, dated Apr. 15, 2009.
Final Office Action from U.S. Appl. No. 11/586,178, dated Nov. 21, 2008.
Non-Final Office Action from U.S. Appl. No. 11/586,178, dated Jun. 9, 2008.
Notice of Allowance from U.S. Appl. No. 11/709,431, dated Jul. 18, 2011.
Notice of Allowance from U.S. Appl. No. 11/709,431, dated Jul. 23, 2010.
Notice of Allowance from U.S. Appl. No. 12/020,932, dated May 16, 2008.
Notice of Allowance from U.S. Appl. No. 12/021,278, dated Sep. 11, 2009.
Notice of Allowance from U.S. Appl. No. 12/134,122, dated Oct. 22, 2010.
Non-Final Office Action from U.S Appl. No. 12/134,122, dated May 24, 2010.
Notice of Allowance from U.S. Appl. No. 12/134,959, dated Aug. 10, 2010.
Non-Final Office Action from U.S Appl. No. 12/134,959, dated Feb. 24, 2010.
Notice of Allowance from U.S. Appl. No. 13/118,386, dated Nov. 9, 2012.
Non-Final Office Action from U.S Appl. No. 13/118,386, dated May 3, 2012.
Notice of Allowance from U.S. Appl. No. 13/192,181, dated Sep. 25, 2012.
Non-Final Office Action from U.S. Appl. No. 13/192,181, dated Jun. 1, 2012.
Non-Final Office Action from U.S. Appl. No. 13/192,181, dated Feb. 22, 2012.
Notice of Allowance from U.S. Appl. No. 13/211,529, dated Dec. 9, 2011.
Notice of Allowance from U.S. Appl. No. 13/218,185, dated Jun. 12, 2012.
Non-Final Office Action from U.S. Appl. No. 13/218,185, dated Mar. 28, 2012.
Notice of Allowance from U.S. Appl. No. 13/348,523, dated Jun. 26, 2014.
Non-Final Office Action from U.S. Appl. No. 13/348,523, dated Jan. 2, 2014.
Notice of Allowance from U.S. Appl. No. 13/566,986, dated Mar. 4, 2013.
Non-Final Office Action from U.S. Appl. No. 13/566,986, dated Nov. 1, 2012.

\* cited by examiner

METHODS AND APPARATUS FOR OVERLAPPING MIMO PHYSICAL SECTORS

CROSS-REFERENCE TO RELATED APPLICATIONS

This application is a continuation of and claims priority under 35 U.S.C. Section 120 from U.S. patent application Ser. No. 14/476,628 by Lastinger filed Sep. 3, 2014, which is a continuation of U.S. patent application Ser. No. 13/348,523 by Lastinger filed Jan. 11, 2012, now U.S. Pat. No. 8,855,089 which is a continuation of U.S. patent application Ser. No. 13/118,386 by Lastinger filed May 28, 2011, now U.S. Pat. No. 8,345,651 which is a continuation of U.S. application Ser. No. 11/709,431 by Lastinger filed Feb. 21, 2007, now U.S. Pat. No. 8,009,646, which claims priority under 35 U.S.C. sctn. 119(e) from U.S. Provisional Patent Application Ser. No. 60/743,376 filed Feb. 28, 2006, each of the aforementioned applications is herein incorporated by reference.

FIELD OF THE INVENTION

Embodiments of the present invention relate to wireless communication using Multiple Input Multiple Output ("MIMO") antennas and methods of operation.

BACKGROUND OF THE INVENTION

Wireless devices find uses in a variety of applications for example, providing communication between computers, wireless cells, clients, hand-held devices, mobile devices, and file servers. Wireless devices with Multiple Input Multiple Output ("MIMO") antennas benefit from spatial diversity and redundant signals. Noise sources may interfere with wireless devices that use MIMO antennas. Wireless communication using devices having MIMO antennas may substantially benefit from selecting a MIMO physical sector and/or a MIMO virtual sector to improve performance.

SUMMARY OF THE INVENTION

A method is provided comprising: providing access to a single wireless cell configured to operate in a packet-switched cellular network, the single wireless cell including: a first transmission point with a multiple-input-multiple-output (MIMO) capability; and a second transmission point with a MIMO capability; cooperating with a MIMO-capable portable wireless device; receiving first information from the first MIMO-capable portable wireless device that is based on the measurement of the first interference; receiving second information from the first MIMO-capable portable wireless device that is based on the measurement of the second interference; altering at least one aspect of a first transmission; and transmitting data during the first transmission to the first MIMO-capable portable wireless device, utilizing at least one of: the multiple first directional antennas of the first transmission point with the MIMO capability, or the multiple second directional antennas of the second transmission point with the MIMO capability.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
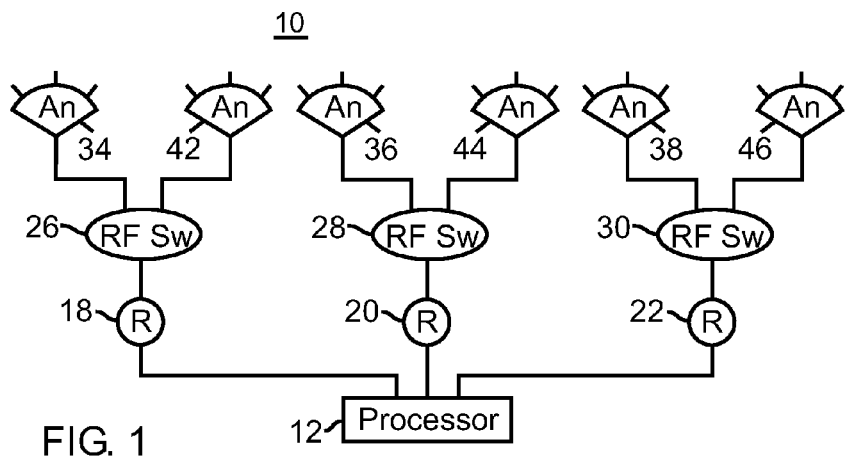
FIG. 1 is a diagram of an exemplary wireless device according to the various aspects of the present invention.

Wireless devices use antennas to transmit and receive radio signals. Noise sources, such as other wireless devices including wireless devices that transmit on the same channel, may interfere with wireless communication. Conventional wireless devices use a variety of techniques to reduce the detrimental effect of noise on communication for example, dividing the area of coverage into sectors, using directional antenna, and using multiple antennas to provide redundancy and spatial diversity.

An improved wireless device, according to the various aspects of the present invention includes directional antennas positioned in such a way that the physical sectors of the antennas of the wireless device overlap and the antennas selected for communication are the antennas whose physical sectors overlap in an area in a manner that permits the antennas to operate as a Multiple Input Multiple Output ("MIMO") antenna.

The wireless device, according to the various aspects of the present invention may select for communication any suitable combination of directional antennas that operate as a MIMO antenna and are oriented in a desired direction of communication. Furthermore, the wireless device may assign any available channel to the antennas to improve performance.

A wireless device, according to the various aspects of the present invention includes, for example, wireless cells, access points, wireless clients, mobile computers, and handheld devices.

The term "physical sector" is understood to mean the area of coverage in which an antenna transmits and receives signals. The size and shape of a physical sector depends on a variety of factors for example, the type of antenna, atmospheric conditions, presence of noise sources, and physical surroundings. Physical sectors 58, 60 and 62 represent the two-dimensional shape of idealized physical sectors of directional antennas. Physical sectors 58, 60 and 62 do not overlap in FIG. 2. Physical sectors 58, 60 and 62 substantially overlap in FIG. 3. Physical sectors 58, 60 and 62 partially overlap in FIGS. 4 and 5.

The term "MIMO antenna" is understood to mean at least two antennas that each transmits and/or receives signals on the same channel in the area where the physical sectors of the antennas overlap. Antennas may be positioned in such a way that their physical sectors overlap. Antennas whose physical sectors overlap in the same area may be configured to operate as a MIMO antenna in that area. Each individual antenna of a MIMO antenna operates on the same channel (e.g., frequency, encoding, or other method of dividing the radio spectrum for communication). A MIMO antenna provides, inter alia, spatial diversity between the antennas, redundancy, and temporal diversity to reduce the effects of noise on transmission and reception. Reducing the effects of noise permits a wireless device to communicate more reliability.

Antennas that form a MIMO antenna may be oriented to use different signal polarization for example, horizontal, vertical, and circular. Antennas that form a MIMO antenna may be physically separated to provide spatial diversity.

MIMO physical sectors are formed to provide communication with increased immunity to noise within the area of the MIMO physical sector. The term "MIMO physical sector" means the area where the physical sectors of the antennas that operate as a MIMO antenna overlap.

Figures 2, 3:
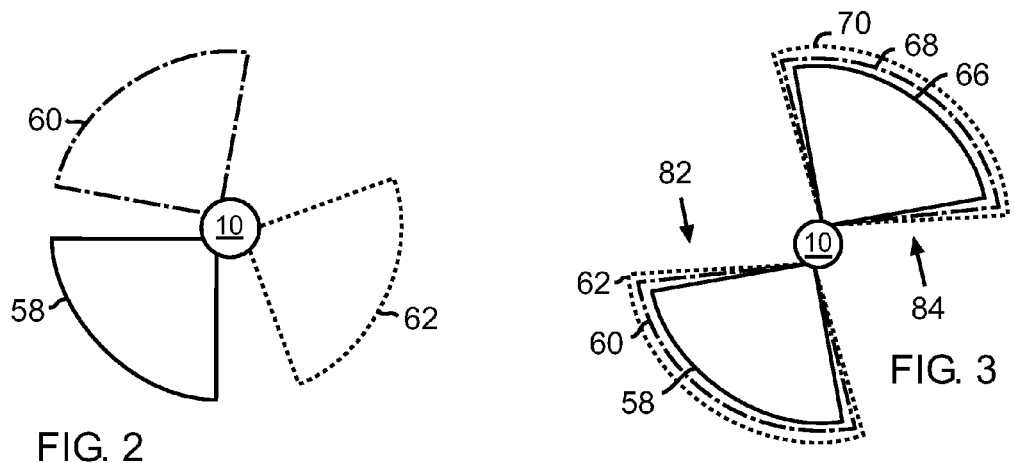
FIG. 2 is a diagram of exemplary physical sectors.
FIG. 3 is a diagram of exemplary physical sectors that form exemplary MIMO physical sectors.
Figure 6:
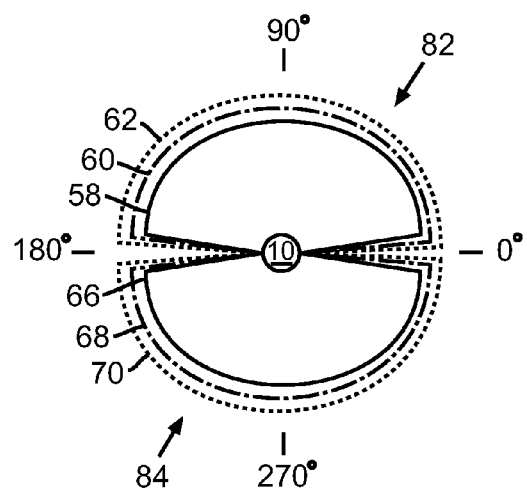
FIG. 6 is a diagram of exemplary MIMO virtual sectors.
Figure 7:
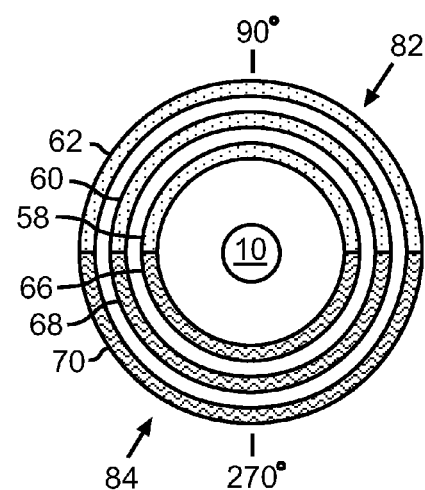
FIG. 7 is a diagram of exemplary alternate method for diagrammatically indicating physical sectors, MIMO physical sectors, and MIMO virtual sectors.

In an exemplary embodiment, referring to FIG. 3, physical sectors 58, 60, and 62 substantially overlap to form MIMO physical sector 82. Physical sectors 66, 68, and 70 substantially overlap to form a MIMO physical sector 84. In this embodiment, each MIMO physical sector has an angle of coverage of about 90 degrees. In another embodiment, referring to FIG. 6, each one physical sector 58, 60, and 62 and each one physical sector 66, 68, and 70 has an angle of coverage of about 180 degrees, thus the resulting MIMO physical sectors 82 and 84 have an angle of coverage of about 180 degrees. FIG. 7 represents an alternate method for diagrammatically representing physical sectors and MIMO physical sectors. Physical sectors 58-62 respectively have about a 180 degree angle of coverage and the center of each physical sector is oriented at approximately 90 degrees (straight up on the page). Each physical sector 58-62 extends from wireless device 10 to the furthest extent reached by the respective antennas even though FIG. 7 shows gaps between the physical sectors for clarity. The MIMO physical sectors 82 and 84 of FIGS. 6 and 7 are equivalent; however, the diagrammatical representation of FIG. 7 provides greater clarity. Thus, MIMO physical sectors 82 and 84 respectively include three substantially overlapping physical sectors 58-62 and 66-70.

Figures 4, 5:
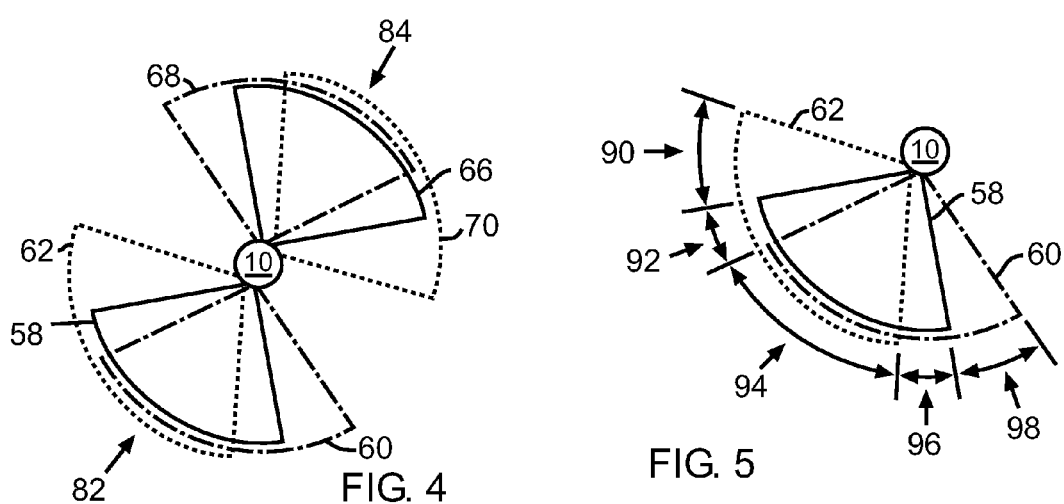
FIG. 4 is a diagram of exemplary MIMO virtual sectors.
FIG. 5 is a diagram of an exemplary MIMO virtual sector.

The physical sectors of the antennas that form a MIMO antenna are not limited to being substantially overlapping. When physical sectors only partially overlap, the MIMO physical sector is the area where the physical sectors of the antennas that form the MIMO antenna overlap. Referring to FIGS. 4 and 5, the antennas associated with physical sectors 58-62 transmit and receive using the same channel. Area 94 is the area where physical sectors 58, 60, and 62 overlap, thus area 94 is a MIMO physical sector. The antennas associated with physical sectors 58-62 operate as a MIMO antenna in area 94. The MIMO physical sector formed by physical sectors 66-70 is also shown in FIG. 4 as MIMO physical sector 82.

Figures 19, 20:
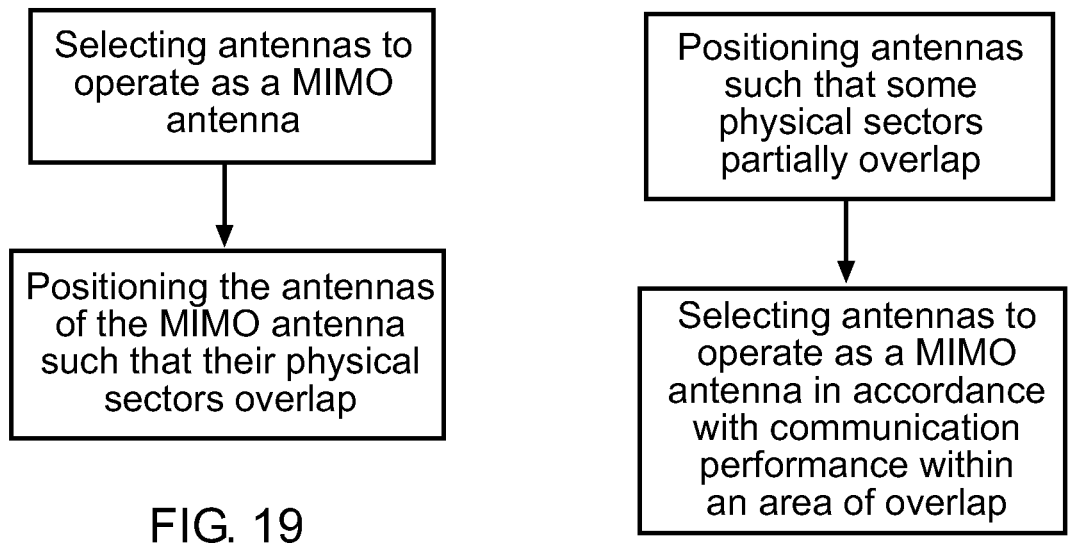
FIG. 19 is a diagram of a method for forming MIMO physical sectors.
FIG. 20 is a diagram of a method for forming MIMO physical sectors.

MIMO physical sectors may be formed in a variety of ways. In one exemplary method for forming a MIMO physical sector, referring to FIG. 19, antennas are selected to operate as a MIMO antenna then the antennas are positioned in such a way that the physical sectors of the antennas overlap. In another exemplary method for forming a MIMO physical sector, referring to FIG. 20, a plurality of antennas are positioned in such a way that the physical sectors of at least some of the antennas at least partially overlap then at least two antennas are selected to operate as a MIMO antenna in the area where their physical sectors overlap to form a MIMO physical sector. The plurality of antennas may be positioned in such a way that the various MIMO physical sectors that are formed are oriented in different directions. At least two antennas may be selected to operate as a MIMO antenna in accordance with the orientation of the MIMO physical sector formed by the physical sectors of the selected antennas. The orientation of some MIMO physical sectors may provide increased performance over the orientation of other MIMO physical sectors. Furthermore, the antennas that form the MIMO antenna may be assigned any available channel. Accordingly, the selected antennas, thus the MIMO physical sector, may be assigned to a channel that provides improved performance.

Figure 13:
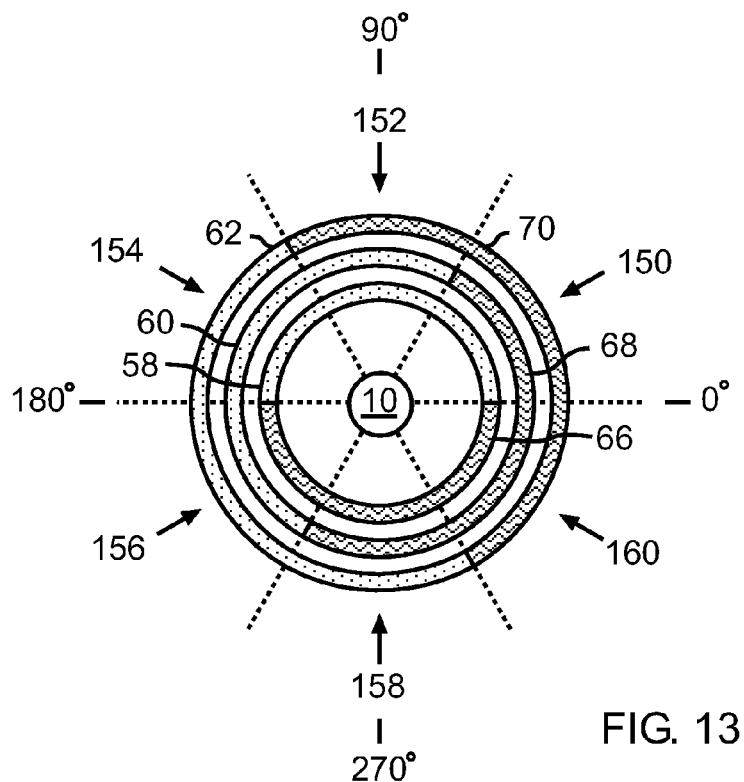
FIG. 13 is a diagram of exemplary physical sectors that partial overlap to form exemplary MIMO virtual sectors.

The term "MIMO virtual sector" means the area where the physical sectors of antennas that may operate as a MIMO antenna overlap. Referring to FIG. 13, physical sectors 58-62 and 66-70 each have an angle of coverage of about 180 degrees respectively. The antennas associated with physical sectors 58-62 and 66-70 are positioned in such a way that in area 150, physical sectors 58, 68, and 70 overlap. In area 152, physical sectors 58, 60, and 70 overlap and so forth for areas 154-160. Each one area 150-160 comprises a MIMO virtual sector because the antennas whose physical sectors overlap in the area may operate as a MIMO antenna. If the antennas associated with physical sectors 58, 68, and 70 are selected to form a MIMO antenna, then area 150 operates as a MIMO physical sector. If the antennas associated with physical sectors 58, 60, and 70 are selected to form a MIMO antenna, then area 152 operates as a MIMO physical sector and so forth for the other areas. Before antennas are selected to form a MIMO physical sector, areas 150-160 are MIMO virtual sectors. When antennas are selected to form a MIMO antenna, the area where the physical sectors of the selected antennas overlap become a MIMO physical sector while the other areas remain MIMO virtual sectors. A MIMO physical sector may also be referred to as a selected MIMO virtual sector or an active MIMO virtual sector. Any criteria may be used to select a MIMO virtual sector for communication.

The method of positioning antennas to form MIMO virtual sectors then selecting antennas to operate as a MIMO antenna permits the wireless device to respond to changes in, inter alia, performance, noise sources, and the environment by communicating through the MIMO physical sector that provides increased performance.

Positioning antennas to form MIMO virtual sectors permits a wireless device with fixed antenna positions to select from a variety of MIMO virtual sectors to communicate using the MIMO physical sector that provides a desired level of performance. When the performance of the selected MIMO physical sector deteriorates due to, inter alia, noise sources or environmental conditions, the wireless device can select different antennas to operate as a MIMO antenna, thereby selecting a different MIMO virtual sector to operate as a MIMO physical sector where the different MIMO physical sector provides increased performance.

MIMO physical sectors permits a wireless device to communicate with increased performance. MIMO virtual sectors permits a wireless device to select an area to transmit and receive in accordance with the MIMO virtual sector that provides a desired level of performance. A wireless device having multiple MIMO virtual sectors may select between the various MIMO virtual sectors. A wireless device may select the MIMO virtual sector that provides an increased level of performance. Positioning the antennas of a wireless device to form MIMO virtual sectors that are oriented in different directions permits the wireless device to select a MIMO physical sector based on the orientation of the virtual sector with relation to the position of noise sources.

Performance may be measure by, inter alia, throughput, data throughput, signal-to-noise ratio, reduced signal error, reduced data errors, reduced retransmission requests, reduced interference, rejection of multipath signals, higher transmission rates, and signal strength.

A MIMO system includes radios and antennas that may be configured to form MIMO antennas, MIMO physical sectors, and MIMO virtual sectors. A MIMO system may form a MIMO antenna using any suitable combination of radios and antennas. A MIMO system may select any suitable MIMO physical sector for communication. A MIMO system may have any suitable number of MIMO virtual sectors and/or selected MIMO virtual sectors. The MIMO system may position its MIMO physical sectors at any orientation. The MIMO physical sectors of a MIMO system may overlap other MIMO physical sectors of the same MIMO system. Overlapping MIMO physical sectors of the same MIMO system may be assigned different channels.

A MIMO system has at least two radios and at least two antennas where at least two radios and two antennas form a MIMO antenna. In another exemplary embodiment, referring to FIG. 1, a MIMO system has three radios with two antennas interfacing with each one radio. Three antennas, one antenna from each radio, may operate as a MIMO antenna, thereby resulting in a MIMO system having two MIMO antennas.

The present invention may employ various types of radios using any type of communication protocol and operating at any frequency and/or with any number of channels suitable for the application. The present invention may use any variety of antennas or groups of antennas for any purpose for example, transmission, reception, noise reduction, and multipath detection. Antennas may be positioned in any manner for example, their physical sectors may be overlapping and non-overlapping. Radios and antennas may operate as a MIMO system, MIMO antennas, MIMO physical sectors, and MIMO virtual sectors. Any type of algorithm and/or processor may be used to enable radios and/or antennas to form and operate as MIMO antennas. Antennas may be selected for communication according to any criteria such as for example, data throughput, signal strength, signal quality, and signal-to-noise ratio.

In one embodiment, the antennas of the wireless device are positioned to form non-overlapping MIMO physical sectors and one of the non-overlapping MIMO physical sectors is selected for communication with other wireless devices. In another embodiment, the antennas of the wireless device are positioned to form overlapping MIMO virtual sectors and some of the MIMO virtual sectors are selected for communication with other wireless devices.

The antennas that form a MIMO antenna may be used in any manner to transmit and/or receive signals for example, any number of antennas that operate as the MIMO antenna may transmit only, receive only, and transmit and receive signals.

In an exemplary embodiment, referring to FIG. 1, antennas 34, 36, and 38, with their associated radios, form a MIMO antenna in which each antenna 34, 36, and 38 transmits and receives the same signals. In another embodiment, antennas 34-38 form a MIMO antenna in which antenna 34 transmits, antenna 36 receives only, and antenna 38 transmits and receives. Different MIMO antenna configurations may provide different communication characteristics. For example, a configuration where all antennas of the MIMO antenna transmit and receive the same information may provide increased error correction. A configuration where antennas transmit and/or receive different information may provide increased data throughput. In an configuration where each antenna of the MIMO antenna receives some version of the same signal, the information content of the various signal versions received by the antennas of the MIMO antenna may be highly similar and/or less similar depending on environmental conditions for example, the presence of noise sources, multipath reflections, and spatial diversity of the antennas. Advanced algorithms may be used to process the signal received by each antenna that form the MIMO antenna to construct a resultant receive signal that contains as much of the receive signal information as can be extracted. The antennas of a MIMO antenna may be configured to receive signals from a common source by positioning the antennas such that their physical sectors overlap.

The number of antennas used to form a MIMO physical sector and the overlap of the physical sectors of the antennas may affect performance. For example, referring to FIGS. 1 and 5, area 90 receives coverage from only physical sector 62, thus communications within area 90 are transmitted and received by only antenna 38. Likewise, area 98 receives coverage only from physical sector 60 and antenna 36. Even when antennas 36 and 38 are selected to operate as a MIMO antennas, areas 90 and 98 are not MIMO physical sectors because only one antenna operates in the area. When only one antenna of the antennas selected to operate as a MIMO antenna transmits and receives in an area, the performance may not be as high as in the areas where the physical sectors of the antennas overlap to form a MIMO physical sector. Areas 92 and 96 receive coverage from physical sectors 58, 62 and 58, 60 respectively. Areas 92 and 96 are MIMO physical sectors because at least two antennas operate as a MIMO antenna in the areas. Communication using at least two antennas of the antennas selected to operate as a MIMO antenna may improve performance. Area 94, a MIMO physical sector formed by the overlap of the physical sectors of three antennas, receives coverage from physical sectors 58, 60 and 62 and their related antennas 34-38. Antennas 34-38 operate as a MIMO antenna, thus reception and/or transmission through all three antennas in area 94 may provide higher performance than reception and/or transmission through areas 90-92 and 96-98. The MIMO physical sector in area 94 is most likely to provide improved performance because all antennas of the MIMO antenna communicate in area 94.

Figure 8:
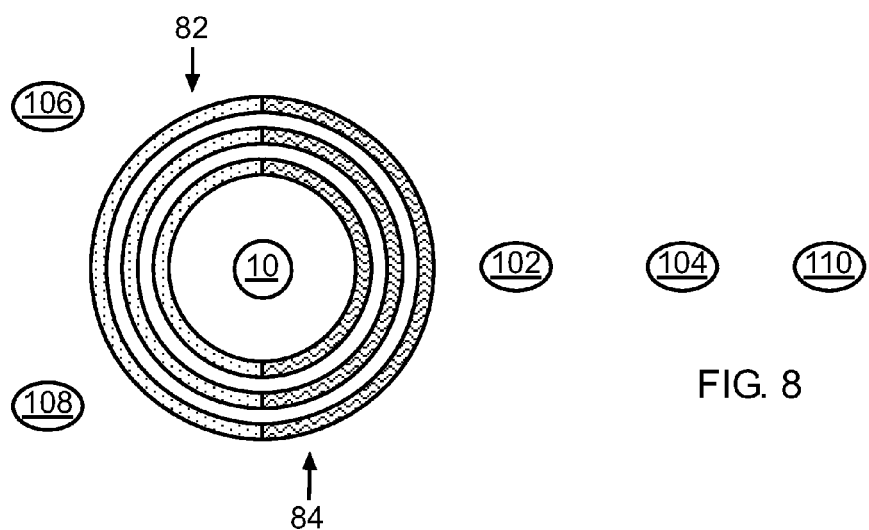
FIG. 8 is a diagram of communication between exemplary wireless devices in the presence of noise sources.

MIMO physical sectors formed using directional antennas may use conventional antenna select methods to reduce interference from noise sources. For example, referring to FIGS. 1 and 8, wireless device 10 comprises processor 12, radios 18-22, RF switches 26-30, and antennas 34-38 and 42-46 where two antennas interfacing with each one RF switch respectively. Antennas 34-38 and 42-46 operate as a first MIMO antenna and a second MIMO antenna respectively. Radios 18-22 use the 802.11a/b/g/n communication protocols. Antenna physical sectors 58-62, associated with antennas 34-38 respectively, substantially overlap to form MIMO physical sector 82. Antenna physical sectors 66-70, associated with antennas 42-46 respectively, substantially overlap to form MIMO physical sector 84. In this embodiment, each radio is set to the same channel. The physical sectors and the MIMO physical sectors 82-84 extend farther than shown in FIG. 8 to enable wireless device 10 to communicate with wireless device 102 and receive interference from noise sources 106 and 108. Wireless device 10 uses RF switches 26-30 to select between antennas 34-38 and 42-46. In this embodiment, the RF switches select between one of two groups of antennas; either antennas 34-38 or antennas 42-46 are selected, thus only one MIMO physical sector, either 82 or 84, is active at any given time. In the embodiment and the scenario described in FIG. 8, wireless device 10 selects MIMO antennas physical sector 84 to reduce interference from noise sources 106 and 108 while communicating with wireless device 102. Wireless device 104 of FIG. 8 may also be implemented using MIMO physical sectors similar to those of wireless device 10. Wireless device 104 may select the MIMO physical sector that provides the best performance while communicating with wireless device 102 and reduces interference from noise source 110.

Figure 9:
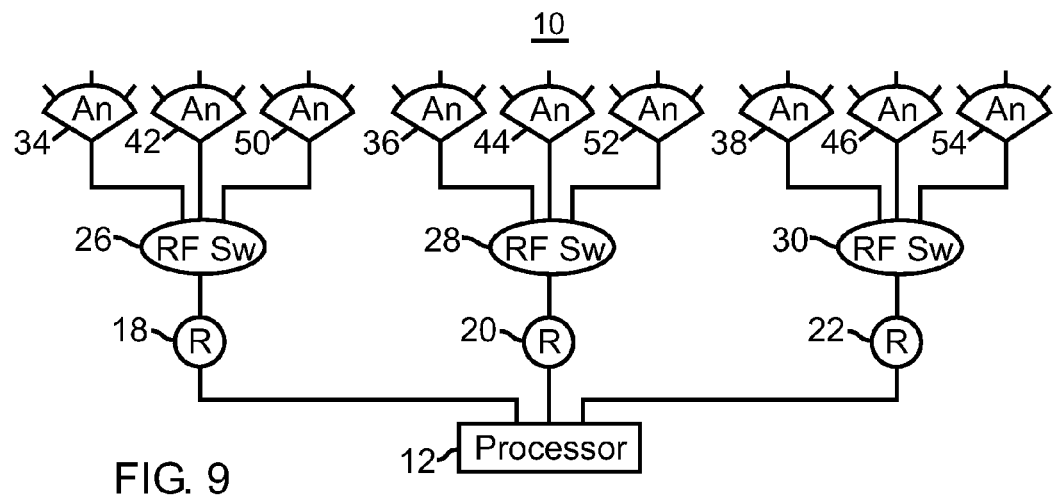
FIG. 9 is a diagram of an exemplary wireless device having three radios and three antennas for each radio.
Figure 10:
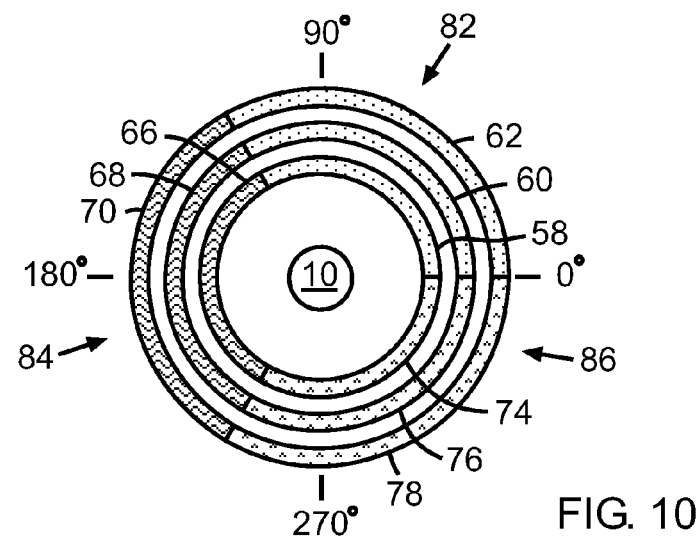
FIG. 10 is a diagram of exemplary physical sectors that form exemplary MIMO physical sectors.

In another embodiment of a MIMO system, referring to FIG. 9, wireless device 10 comprises a processor 12, three radios 18-22, three RF switches 26-30, and three antennas interfacing with each RF switch. Antennas 34-38, 42-46, and 50-54 may have any angle of coverage, be oriented in any direction, form MIMO antennas, and form MIMO virtual sectors in any manner. In an exemplary embodiment, referring to FIG. 10, each antenna 34-38, 42-46, and 50-54 has an angle of coverage of about 120 degrees. Antennas 34-38 are oriented so that their associated physical sectors, 58-62 respectively, substantially overlap to form MIMO physical sector 82. Antennas 42-46 are oriented so that their associated physical sectors, 66-70 respectively, substantially overlap to form MIMO physical sector 84. Antennas 50-54 are oriented so that their associated physical sectors, 74-78 respectively, substantially overlap to form MIMO physical sector 86. Physical sectors 58-62, 66-70, and 74-78 are oriented such that the center of MIMO physical sectors 82, 84, and 86 are respectively oriented at about 60, 180, and 300 degrees respectively. In this embodiment, the MIMO physical sectors do not substantial overlap. Each radio is set to the same channel, thus the MIMO physical sectors 82-86 each use the same channel. The wireless device embodiment of FIGS. 9 and 10 may also be used to reduce interference with noise sources by selected one of the three MIMO physical sectors for communication.

In another embodiment, not shown, wireless device 10 comprises a processor, four radios, an RF switch interfacing with each one radio, and four directional antennas interfacing with each one RF switch. Each antenna has an angle of coverage of about 90 degrees. The physical sectors of one antenna from each RF switch substantially overlap to form a MIMO physical sector resulting in a MIMO system having four MIMO virtual sectors. Each MIMO physical sector receives coverage from each one of the four radios. The physical sectors of the antennas are oriented in such a way that the MIMO physical sectors do not overlap and the MIMO physical sectors provide a combined angle of coverage of about 360 degrees. All radios are set to the same channel.

In another embodiment, not shown, wireless device 10 comprises a processor, two radios interfacing with the processor, an RF switch interfacing with each one of the radios, and three directional antennas interfacing with each one RF switch. Each antenna has an angle of coverage of about 120 degrees. The physical sectors of one antenna from each one RF switch substantially overlap to form a MIMO physical sector resulting in a MIMO system having three MIMO virtual sectors. Each MIMO physical sector receives coverage from each one of the two radios. The physical sectors of the antenna are oriented in such a way that the MIMO physical sectors do not overlap and the MIMO physical sectors provide a combined angle of coverage of about 360 degrees. All radios are set to the same channel.

In another embodiment, not shown, wireless device 10 comprises a processor, two radios interfacing with the processor, an RF switch interfacing with each one of the radios, and "N" directional antennas interfacing with each one RF switch. Each antenna has an angle of coverage of about 360 degrees divided by N. Two antennas, one from each RF switch, form a MIMO antenna, thereby forming N MIMO antennas. The physical sectors of the antennas that form each MIMO antenna substantially overlap to form N MIMO physical sectors. The MIMO physical sectors are oriented in such a way that the MIMO physical sectors do not substantially overlap, thereby providing a combined angle of coverage of about 360 degrees. All radios are set to the same channel.

Radios, antennas, and MIMO physical sectors are not limited to using a single channel for communication or to forming MIMO physical sectors that are substantially non-overlapping. Radios may be grouped to provide MIMO physical sectors that use different channels. MIMO physical sectors that communicate on different channels may be positioned to overlap. Overlapping MIMO physical sectors that use different channels may simultaneously communicate less mutual interference.

Figure 11:
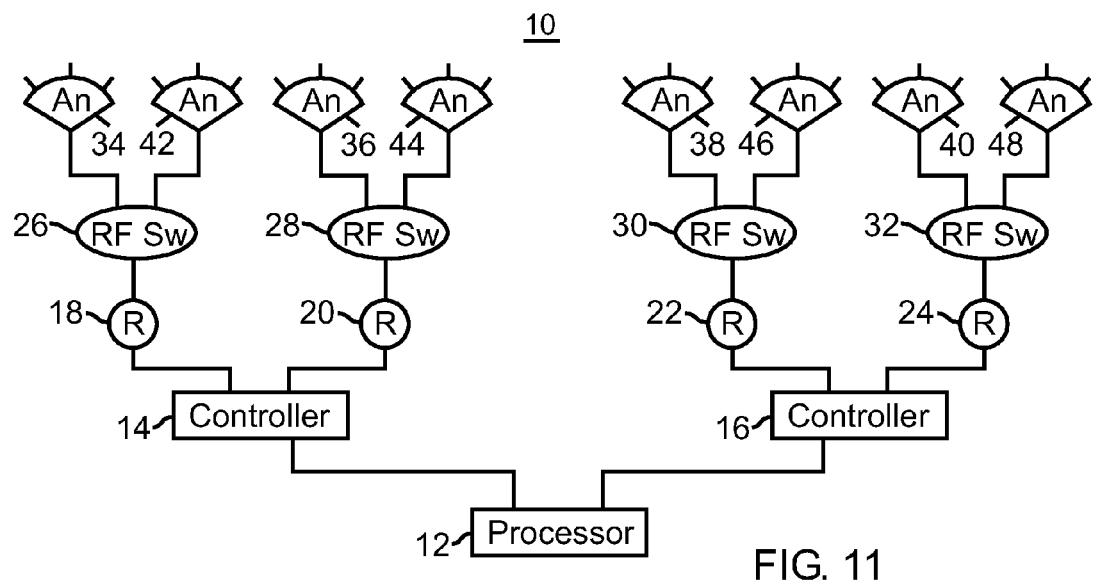
FIG. 11 is a diagram of an exemplary wireless device having two radio groups, each group having two radios and two antennas for each radio.

In one embodiment, referring to FIG. 11, wireless device 10 comprises a process 12, controllers 14, 16 interfaces with processor 10, two radios 18, 20 interface with controller 14 thereby forming a first radio group, two radios 22, 24 interface with controller 16 thereby forming a second radio group, an RF switch 26, 28, 30, 32 interfaces with radio 18, 20, 22, 24 respectively, antennas 34-48 interface with the RF switches in such a manner that two antennas interface with each one RF switch. The antennas may form MIMO antennas any manner; however, forming MIMO antennas using antennas from the same group enables MIMO physical sectors from different groups to operate on different channels.

In one embodiment, antennas 34 and 36 form a first MIMO antenna. Antennas 42 and 44 form a second MIMO antenna. The first and second MIMO antennas belong to the first radio group. Antennas 38 and 40 form a third MIMO antenna. Antennas 46 and 48 form a fourth MIMO antenna.

The third and fourth MIMO antennas belong to the second radio group. In another embodiment, antennas 34-40 form a first MIMO antenna and antennas 42-48 form a second MIMO antenna.

Figure 12:
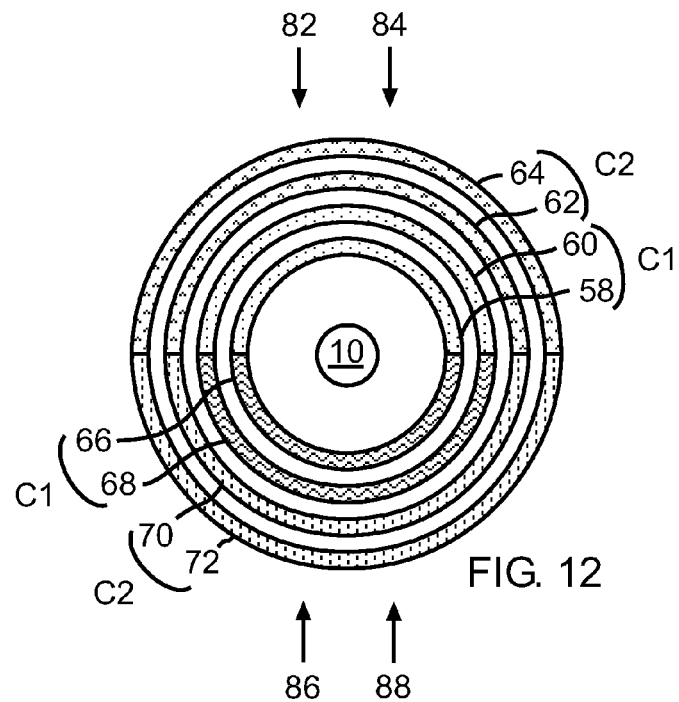
FIG. 12 is a diagram of exemplary physical sectors that substantially overlap to form exemplary MIMO physical sectors.

The antennas and their respective physical sectors may have any angle of coverage and be oriented in any direction. The antennas of the various groups may form MIMO antennas in any manner. The resulting MIMO physical sectors may be overlapping or non-overlapping. In an exemplary embodiment, antennas 34, 36, 38, 40, 42, 44, 46, and 48 and their respective physical sectors 58, 60, 62, 64, 66, 68, 70, and 72 each have an angle of coverage of about 180 degrees. Referring to FIGS. 11 and 12, physical sector 58 substantially overlaps physical sector 60 to form MIMO physical sector 82. Physical sectors 62 and 64 substantially overlap, 66 and 68 substantially overlap, and 70 and 72 substantially overlap to form MIMO physical sectors 84, 86, and 88 respectively. The center of the angles of coverage of antennas 34, 36 and 38, 40 are oriented at about 90 degrees (e.g., up the page), thus MIMO physical sectors 82 and 84 overlap. The center of the angles of coverage of antennas 42, 44 and 46, 48 are oriented at about 270 degrees (e.g., down the page), thus MIMO physical sectors 86 and 88 substantially overlap. Radios 18 and 20 belong to the first radio group and radios 22 and 24 belong to the second radio group. Assigning channel C1 to the first radio group and channel C2 to the second radio group results in MIMO physical sectors 82 and 86 using channel C1 and MIMO physical sectors 84 and 88 using channel C2. Thus, the channel assignment, the antenna orientation, and the MIMO antenna configurations provide overlapping MIMO physical sectors that use different channels. Referring to FIG. 12, MIMO physical sector 82 is assigned to C1, MIMO physical sector 84 is assigned to C2, and MIMO physical sector 82 substantially overlaps MIMO physical sector 84. Because MIMO physical sectors 82 and 84 are assigned different channels, they may communicate with different wireless devices simultaneously with less mutual interference. MIMO physical sectors formed using antennas from different radio groups enables the MIMO physical sectors to overlap, be assigned different channels, and communicate simultaneously. MIMO antennas of the same radio group use the same channel. Interference between MIMO physical sectors formed using antennas from the same group may be reduced by, for example, positioning the MIMO physical sectors in such a way that they do not overlap and communicating using only one MIMO physical sector from the same group at any one time.

In another embodiment, referring to FIG. 11, each one antenna 34-48 has a physical sector with an angle of coverage of about 90 degrees. Antennas are organized, as described above, to form four MIMO antennas. Antenna physical sectors are positioned such that the center of the angle of coverage for antennas pairs 34 and 36, 38 and 40, 42 and 44, and 46 and 48 and their respective physical sectors are oriented at 45, 135, 225, and 315 degrees respectively. Channel C1 is assigned to the first group radios and channel C2 is assigned to the second group radios. The resulting four MIMO physical sectors are positioned to not substantially overlap and adjacent MIMO physical sectors are assigned a different channel. One MIMO physical sector from the first radio group and one MIMO physical sector from the second radio group may operate simultaneously.

The antennas of wireless device 10 may be oriented to form MIMO virtual sectors. MIMO virtual sectors may have any angle of coverage and be oriented in any manner. A MIMO virtual sector may be selected for communication to decrease interference. In one embodiment, referring to FIGS. 1 and 13, antennas 34-38 and 42-46 have an angle of coverage of about 180 degrees. Antennas 34, 36, 38, 42, 44, 46 and the center of the angle of coverage of their respective physical sectors 58, 60, 62, 66, 68, 70 are oriented at 90, 150, 210, 270, 300, and 30 degrees respectively. The area between 0 and 60 degrees, marked as area 150 in FIG. 13, is covered by physical sectors 58, 68, and 70. Antennas 34, 44, and 46 may function together as a MIMO antenna to transmit signals to and receive signals from any wireless device within area 150. Areas 152, 154, 156, 158, and 160 are respectively positioned between about 60-120 degrees, about 120-180 degrees, about 180-240 degrees, about 240-300 degrees, and about 300-0 degrees and are serviced respectively by antennas 34, 36, and 46; 34, 36 and 38; 42, 36 and 38; 42, 44 and 38; and 42, 44 and 46. Each one area 150-160 comprises a MIMO virtual sector.

In an exemplary embodiment, referring to FIGS. 1 and 13, area 150 operates as a MIMO physical sector by forming a MIMO antenna using antennas 34, 44, and 46. Area 152 operates as a MIMO physical sector by forming a MIMO antenna using antennas 34, 36, and 46, and so forth for areas 154-160. In this embodiment, areas 158 and 160 may not be combined to operate as a MIMO physical sector because area 158 requires antennas 42, 44, and 38 to form a MIMO antenna while area 160 requires antennas 42, 44, and 46 to form a MIMO antenna. Because RF switch 30 selects only one antenna at a time, MIMO physical sectors, for this embodiment, are limited to any combination of any one antenna associated with each RF switch. In this embodiment, wireless device 10 may select and communicate through any one MIMO virtual sector at any given time. The method of selecting the MIMO virtual sector consists of setting the RF switches to select the antennas that service the desired MIMO virtual sector. In another embodiment, an RF switch with its associated antennas may be replaced by a phased array. Antenna elements of each phased array may form MIMO antennas.

Figure 14:
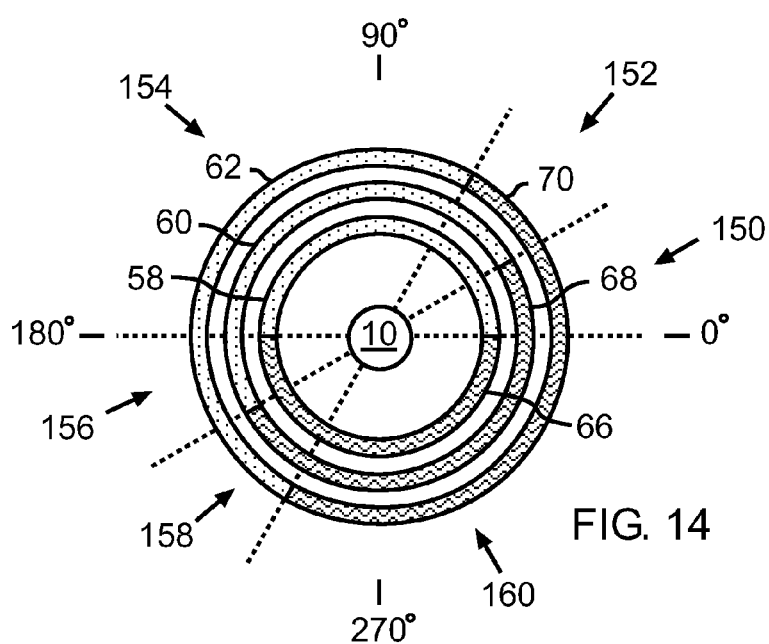
FIG. 14 is a diagram of exemplary physical sectors that partial overlap to form exemplary MIMO virtual sectors.
Figure 15:
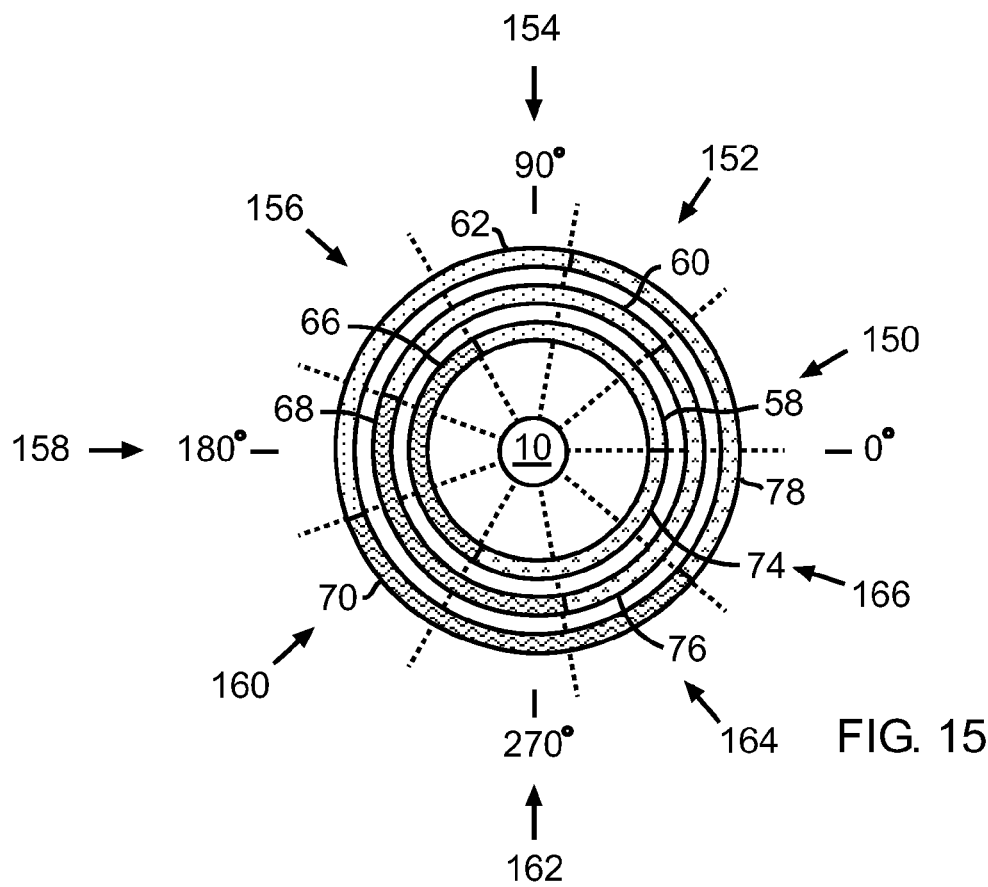
FIG. 15 is a diagram of exemplary physical sectors that partial overlap to form exemplary MIMO virtual sectors.
Figure 16:
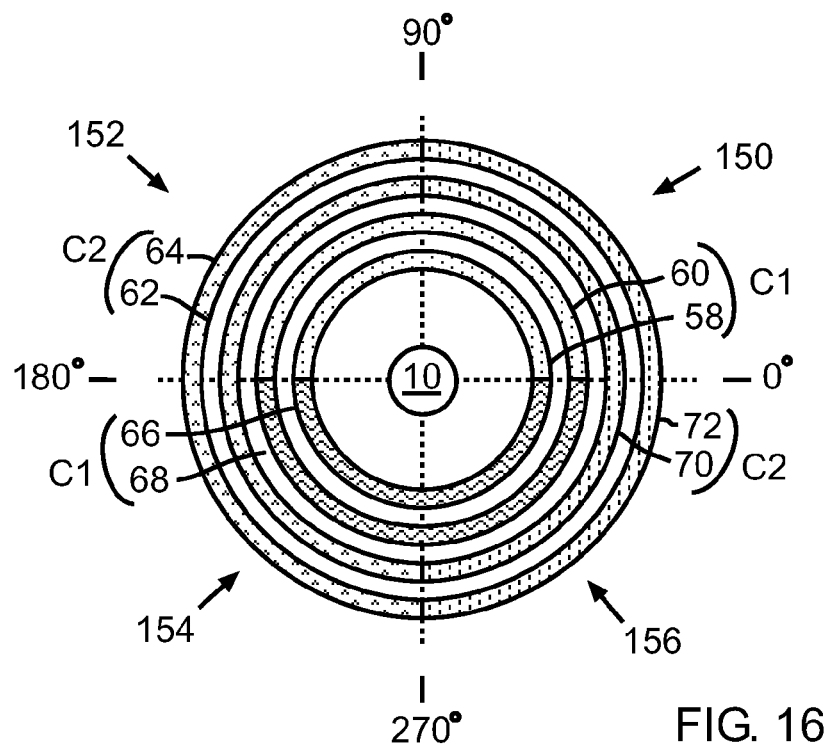
FIG. 16 is a diagram of exemplary physical sectors that substantially overlap to form exemplary MIMO physical sectors and exemplary MIMO physical sectors that partially overlap to form exemplary MIMO physical sectors.
Figure 18:
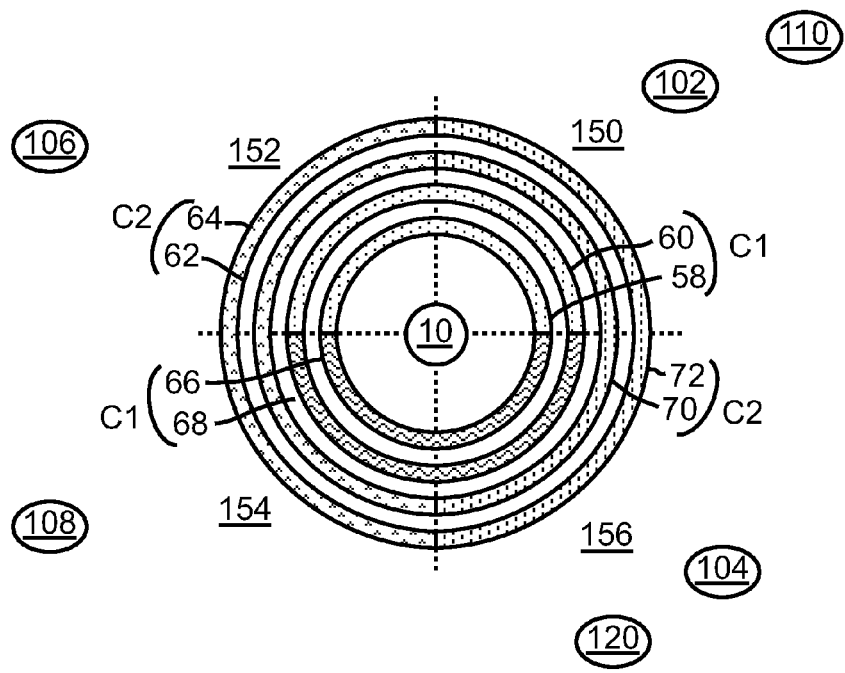
FIG. 18 is a diagram of communication between exemplary wireless devices in the presence of exemplary noise sources.

Antennas may be oriented in any manner to form MIMO virtual sectors of any size. In an exemplary embodiment, referring to FIG. 13, each MIMO virtual sector 150-160 has an angle of coverage of about 60 degrees. In another embodiment, referring to FIG. 14, MIMO virtual sectors 150, 152, 154, 156, 158, and 160 lie between 0-30 degrees, 30-60 degrees, 60-180 degrees, 180-210 degrees, 210-240 degrees, and 240-0 degrees respectively. In another embodiment, referring to FIG. 15, each MIMO virtual sector has an angle of coverage of about 40 degrees. MIMO virtual sectors 150-166 lie between 0-40 degrees, 40-80 degrees, 80-120 degrees, 120-160 degrees, 160-200 degrees, 200-240 degrees, 240-280 degrees, 280-320 degrees, and 320-0 degrees respectively. In another embodiment, referring to FIGS. 11 and 18, each MIMO virtual sector has an angle of coverage of about 90 degrees. Channel C1 is assigned to the first group radios and channel C2 is assigned to the second group radios. Antenna pairs 34 and 36, 38 and 40, 42 and 44, and 46 and 48 respectively form MIMO antennas. MIMO virtual sectors formed by antennas 34, 36 and 42, 44 extend from 0-180 and 180-0 degrees respectively and are assigned channel C1. MIMO virtual sectors formed by antennas 38, 40 and 46, 48 extend from 90-270 and 270-90 degrees respectively and are assigned channel C2. The MIMO virtual sectors are positioned to form areas 150-156 which each receive coverage from two MIMO virtual sectors that operate on different channels.

A wireless device may select and communicate through a MIMO virtual sector to improve performance. A wireless device may use any criteria for selecting a MIMO virtual sector for communication such as, for example, the presence of noise sources, noise source channels used, signal-to-strength ratio, direction of primary data flow, signal quality, signal strength, and data throughput.

Figure 17:
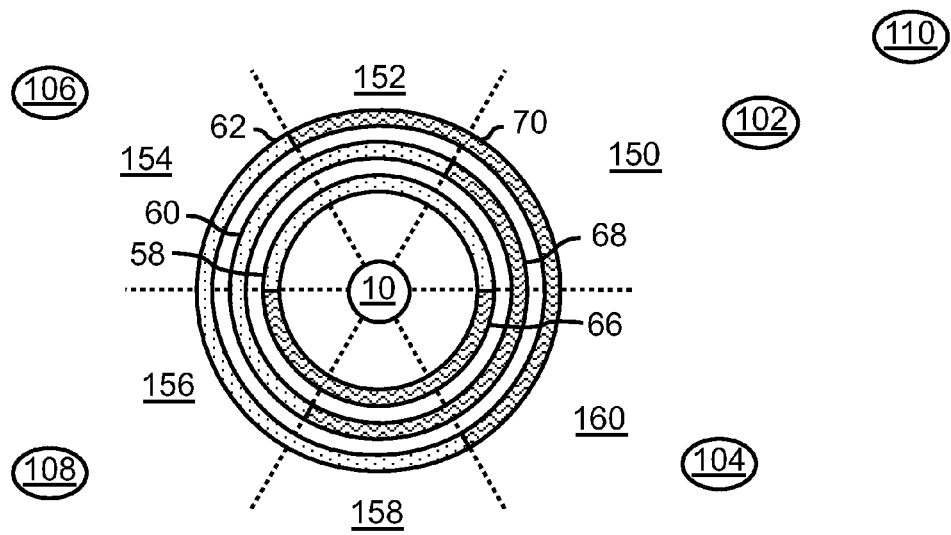
FIG. 17 is a diagram of communication between exemplary wireless devices in the presence of noise sources.

In one embodiment, referring to FIGS. 9 and 17, wireless device 10 desires to communicate with wireless device 102. Wireless device 10 successively enables each antenna combination that forms each MIMO virtual sector 150-160. Through each MIMO virtual sector, wireless device 10 measures its ability to communicate with wireless device 102. Through at least MIMO virtual sector 150, wireless device 10 detects the presence of noise source 110. Through at least MIMO virtual sectors 154 and 156, wireless device 10 detects the presence of noise sources 106 and 108 respectively. While communicating with wireless device 102, wireless device 10 may reduce interference from noise sources 106 and 108 by selecting and communicating through MIMO virtual sector 150. In the embodiment of wireless device 10 shown in FIGS. 1 and 17, areas adjacent to the selected MIMO virtual sector have at least one antenna in common, thus selecting a MIMO virtual sector does not disable all communication in other sectors, but communication within the selected MIMO virtual sector may provide increased performance than adjacent areas because it transmits and/or receives using all the antennas that form the MIMO antenna.

Referring still to FIGS. 1 and 17, wireless device 10 may reduce interference from noise source 110 by selecting a channel that is different from the channel used by noise source 110. In the event that wireless device 102 cannot switch to a channel that is not used by noise source 110, communication with wireless device 102 may proceed using MIMO virtual sector 150 if it provides a desired level of performance. A wireless device may select any MIMO virtual sector that provides a desired level of performance. In this embodiment, wireless device 10 may select MIMO virtual sector 152 to communicate with wireless device 102. Wireless device 10 may detect less interference from noise source 110 through MIMO virtual sector 152 than it detects through MIMO virtual sector 150, but wireless device 10 may also receive a less desirable signal from wireless cell 102. In the event that wireless device 10 desires to communicate with wireless device 104 and noise sources 106, 108, and 110 all operate on the same channel as wireless device 104, wireless cell 10 may reduce interference from the noise sources by selecting MIMO virtual sector 160 for communicating with wireless device 104. A wireless device may select and use any MIMO virtual sector for any duration of time. A wireless device may switch from using one MIMO virtual sector to using any other MIMO virtual sector at any time and for any purpose. In an exemplary embodiment, referring to FIG. 17, wireless device 10 switches between MIMO virtual sectors 150 and 160 to communicate with wireless devices 102 and 104 respectively. Additionally, a wireless device may transmit through one MIMO virtual sector and receive through a different MIMO virtual sector. In another embodiment, referring to FIGS. 11 and 18, wireless device 10 may select the MIMO virtual sector that provides a desired level of communication for each area. Additionally, wireless device 10 may communicate with two wireless devices 104 and 120, both in area 156, simultaneously on different channels; for example, wireless device 104 communicates using channel C1 while wireless device 120 communicates using channel C2.

Unless contrary to physical possibility, the inventor envisions the methods and systems described herein: (i) may be performed in any sequence and/or combination; and (ii) the components of respective embodiments combined in any manner.

This application incorporates by reference U.S. provisional application Ser. No. 60/484,800 filed on Jul. 3, 2003; U.S. provisional application Ser. No. 60/493,663 filed on Aug. 8, 2003; U.S. provisional application Ser. No. 60/692,490 filed on Jun. 21, 2005; U.S. utility application Ser. No. 10/869,201 filed on Jun. 15, 2004 and issued under U.S. Pat. No. 7,302,278; and U.S. utility application Ser. No. 10/880,387 filed on Jun. 29, 2004 and issued under U.S. Pat. No. 7,359,675, in their entirety for the teachings taught therein.

The wireless cell can ask the advanced client to measure and report communication statistics such as, but not limited to, bit error rate, signal-to-noise ratio, dropped bits, signal strength, number of retransmission requests or any other environmental or communication parameter. Each antenna and antenna controller functions independently of the other antennas and controllers.

The antenna controller sets the beam width, beam azimuth, beam steering, gain of the antenna and any other parameter available on adjustable antennas. The antennas are also capable of high-speed switching. The controllable characteristics of the antenna are dynamically modifiable. The antenna beam can steer directly at one receiving client during transmission then pointed at a second client when transmission to the second client begins. The beam width of the antenna can be increased or decreased as necessary; however, it is preferable to not increase the beam width to provide antenna coverage beyond the width of a sector. If the beam width is adjusted to provide coverage wider than a sector, the radio signal may interfere with adjacent or opposing sectors or wireless cells or detect clients not associated with the sector or wireless cell. The processor is responsible for tracking the antenna characteristics best suited to service each client in the sector covered by the antenna and to set the antenna controller to the parameters best suite for the particular client when communicating with the client. The use of an adjustable antenna, an antenna controller and a processor capable of controlling the antenna controller is not limited to the six-sector embodiment of a wireless network, but can also be used in a four-sector wireless cell or other wireless cell types. Preferably, the beam width would not exceed the width of the sector of the wireless cell in which it is used.

MIMO antennas may use any combination of spatial, polarization, or angle antenna diversity. The MIMO antenna array may be fixed or adaptive for either transmit, receive, or both. When receiving, the MIMO antenna may use, for example, a maximum ratio combiner, an optimal linear combiner, selection diversity, or any combination of these methods or other methods for combining the signals from multiple antennas into a single signal. When transmitting, the MIMO antenna may use any type of encoding including, for example, OFDM, space-time-codes, or weighting of the antenna signals in the array to accomplish beam steering.

During transmission or reception, all or any subset of antennas in the MIMO array may be used or selection diversity may be used to limit the number of antennas used.

Antenna diversity may be used in the transmit path, in the receive path, or in both transmit and receive paths. The signal from each antenna, transmitted or received, may or may not be weighted.

Servicing a physical sector with a MIMO antenna means that all antennas in the MIMO array use the channel assigned to the physical sector. Signal attenuation may be added after each antenna, after the signal combiner, or in the signal processor that manipulates the incoming signals.

Although MIMO antennas are arrays of antennas, any antenna array may be used as a single antenna or a MIMO antenna may be used. For example, a directional antenna with about 120-degree angle of coverage may be replaced by an antenna array that provides similar coverage. The array may be fixed or adaptive. Adaptive arrays may use adaptive array weights to transmit directional beams within the angle and area of coverage to send a stronger signal to a desired client. During reception, an adaptive array may use array weights to direct a beam substantially towards the transmitting client and substantially null out any sources of interference.

The processor, in exemplary embodiments, in addition to getting receive data from and sending transmit data to the radios, may also send instructions to control the radios such as, for example, instructing a radio to change channels or getting control information from the radios. In exemplary embodiments, the processor may also be capable of, for example, varying attenuation, controlling any or all RF switches, maintaining route tables, maintaining client specific information, and handing off mobile clients.

In an exemplary embodiment, the processor may also control, for example, the attenuation or RF switches on a transmit or receive basis, a per client basis, a fixed period basis, and on a per demand basis.

Some embodiments may have a network connection that may enable the wireless cell to communicate with a wired network. Some embodiments may have local storage to store, for example, transmit and receive date, relay data, video or audio data, environmental conditions data, and any other type of data required to service clients, function as a network, handoff or receive mobile clients, and forward information.

When receiving, the MIMO antenna may use, for example, a maximum ratio combiner, an optimal linear combiner, selection diversity, or any combination of these methods or other methods for combining the signals from multiple antennas into a single signal.

Assume for this example that the communication protocol uses packetized data and that the clients must transmit RTS and await a CTS before transmitting a single packet. It is possible to switch a client, or multiple clients, from a packet based communication protocol to a data stream protocol to increase the efficiency of long data transfers between clients.

Another aspect of the invention is the use of multiple directional antennas, at least one radio, at least one attenuator and other electronic devices such as RF switches, packet switches, antenna sharing devices and other electronic and electrical components to generate various embodiments of wireless cells and wireless networks with differing characteristics and capabilities.

Although there have been described preferred embodiments of this novel invention, many variations and modifications are possible and the embodiments described herein are not limited by the specific disclosure above, but rather should be limited only by the scope of the appended claims.

The invention claimed is:

1. A method, comprising:
   providing access to a single wireless station configured to operate in a packet-switched cellular network, the single wireless station including:
      a first transmission point with a multiple-input-multiple-output (MIMO) capability, the first transmission point having:
         a plurality of first directional antennas,
         at least one first radio in communication with the first directional antennas, and
         first circuitry in communication with the at least one first radio; and
      a second transmission point with a multiple-input-multiple-output (MIMO) capability, the second transmission point having:
         a plurality of second directional antennas,
         at least one second radio in communication with the second directional antennas, and
         second circuitry in communication with the at least one second radio;
   cooperating with a multiple-input-multiple-output (MIMO)-capable portable wireless device including:
      a plurality of mobile device directional antennas,
      at least one mobile device radio in communication with the mobile device directional antennas, and
      mobile device circuitry in communication with the at least one mobile device radio, said multiple-input-multiple-output (MIMO)-capable portable wireless device configured for:
         measuring a first interference for the first transmission point with the multiple-input-multiple-output (MIMO) capability of the single wireless station, utilizing at least one of the mobile device directional antennas, and
         measuring a second interference for the second transmission point with the multiple-input-multiple-output (MIMO) capability of the single wireless station, utilizing at least one of the mobile device directional antennas;
   receiving first information from the multiple-input-multiple-output (MIMO)-capable portable wireless device that is based on the measurement of the first interference;
   receiving second information from the multiple-input-multiple-output (MIMO)-capable portable wireless device that is based on the measurement of the second interference;
   altering at least one aspect of a first transmission utilizing at least one of: multiple of the first directional antennas of the first transmission point with the multiple-input-multiple-output (MIMO) capability, or multiple of the second directional antennas of the second transmission point with the multiple-input-multiple-output (MIMO) capability, based on the first information and the second information; and
   transmitting data during the first transmission to the multiple-input-multiple-output (MIMO)-capable portable wireless device, utilizing at least one of: the multiple first directional antennas of the first transmission point with the multiple-input-multiple-output (MIMO) capability, or the multiple second directional antennas of the second transmission point with the multiple-input-multiple-output (MIMO) capability.

2. The method of claim 1, wherein the first interference and the second interference are measured utilizing different ones of the mobile device directional antennas.

3. The method of claim 1, wherein the first directional antennas and the second directional antennas include multiple-input-multiple-output (MIMO) antennas.

4. The method of claim 1, wherein at least one of the first information or the second information is a function of at least one of: a data throughput, a signal-to-noise ratio, a reduced signal error, a reduced data error, a reduced retransmission request, a reduced interference, a rejection of multipath signal, a higher transmission rate, or a signal strength, associated with the multiple-input-multiple-output (MIMO)-capable portable wireless device.

5. The method of claim 1, and further comprising communicating with the multiple-input-multiple-output (MIMO)-capable portable wireless device via a same channel, utilizing the first transmission point with the multiple-input-multiple-output (MIMO) capability and the second transmission point with the multiple-input-multiple-output (MIMO) capability, but with each of the first transmission point and the second transmission point exhibiting at least one different channel characteristic.

6. The method of claim 5, wherein the at least one different channel characteristic includes at least one of: a channel characteristic that is throughput-related, a channel characteristic that is signal-to-noise ratio-related, a channel characteristic that is signal strength-related, or a channel characteristic that is multipath signal-related, in connection with the same channel.

7. The method of claim 5, wherein the at least one different channel characteristic includes at least two of: a channel characteristic related to a throughput-related aspect, a channel characteristic related to a signal-to-noise ratio-related aspect, a channel characteristic related to a signal strength-related aspect, and a channel characteristic related to a multipath signal-related aspect.

8. The method of claim 5, wherein the at least one different channel characteristic includes at least three of: a channel characteristic that is throughput-related, a channel characteristic that is signal-to-noise ratio-related, a channel characteristic that is signal strength-related, and a channel characteristic that is multipath signal-related.

9. The method of claim 5, wherein the at least one different channel characteristic includes at least four of: a channel characteristic related to a throughput-related aspect, a channel characteristic related to a signal-to-noise ratio-related aspect, a channel characteristic related to a signal strength-related aspect, and a channel characteristic related to a multipath signal-related aspect.

10. The method of claim 1, wherein the altering the at least one aspect includes selecting both the multiple first directional antennas of the first transmission point with the multiple-input-multiple-output (MIMO) capability and the multiple second directional antennas of the second transmission point with the multiple-input-multiple-output (MIMO) capability for the first transmission to the multiple-input-multiple-output (MIMO)-capable portable wireless device, and the same data is transmitted to the multiple-input-multiple-output (MIMO)-capable portable wireless device via a same channel, utilizing both the multiple first directional antennas of the first transmission point with the multiple-input-multiple-output (MIMO) capability and the multiple second directional antennas of the second transmission point with the multiple-input-multiple-output (MIMO) capability.

11. The method of claim 1, wherein the altering the at least one aspect includes selecting only one of: the multiple first directional antennas of the first transmission point with the multiple-input-multiple-output (MIMO) capability, or the multiple second directional antennas of the second transmission point with the multiple-input-multiple-output (MIMO) capability for the first transmission to the multiple-input-multiple-output (MIMO)-capable portable wireless device, and the data is transmitted to the multiple-input-multiple-output (MIMO)-capable portable wireless device, utilizing only the selected one of: the multiple first directional antennas of the first transmission point with the multiple-input-multiple-output (MIMO) capability, or the multiple second directional antennas of the second transmission point with the multiple-input-multiple-output (MIMO) capability.

12. The method of claim 1, and further comprising selectively directing a beam associated with the first transmission to improve the transmission of the data by addressing interference.

13. The method of claim 1, wherein the altering the at least one aspect includes altering beamforming utilizing at least one of: the multiple first directional antennas of the first transmission point with the multiple-input-multiple-output (MIMO) capability, or the multiple second directional antennas of the second transmission point with the multiple-input-multiple-output (MIMO) capability for the first transmission to the multiple-input-multiple-output (MIMO)-capable portable wireless device, and the data is transmitted to the multiple-input-multiple-output (MIMO)-capable portable wireless device, utilizing the beamforming with the at least one of: the multiple first directional antennas of the first transmission point with the multiple-input-multiple-output (MIMO) capability, or the multiple second directional antennas of the second transmission point with the multiple-input-multiple-output (MIMO) capability.

14. The method of claim 13, wherein the beamforming involves weighting and the altering is performed to improve the first transmission independent of a handoff.

15. The method of claim 1, wherein at least one of:
said first directional antennas are multiple-input-multiple-output (MIMO) antennas;
said second directional antennas are multiple-input-multiple-output (MIMO) antennas;
said first directional antennas and the second directional antennas reduce the effects of noise on transmission and reception;
said first directional antennas exhibit temporal diversity;
said second directional antennas exhibit temporal diversity;
said at least one first radio is in communication with the first directional antennas via at least one switch;
said at least one first radio is in communication with the first directional antennas via at least one phased array;
said at least one first radio includes a single radio that is in communication with the plurality of first directional antennas;
said at least one second radio is in communication with the second directional antennas via at least one switch;
said at least one second radio is in communication with the second directional antennas via at least one phased array;
said at least one second radio includes a single radio that is in communication with the plurality of second directional antennas;
said first circuitry includes at least one controller;
said second circuitry includes at least one controller;
said first transmission point includes a first portion and the second transmission point includes a second portion;
said first transmission point includes a first part and the second transmission point includes a second part;
said first transmission point includes a first group and the second transmission point includes a second group;
said single wireless station includes a single wireless cell;
said single wireless station includes at least one wireless cell;
said altering is performed by third circuitry;
said altering includes selecting both the multiple first directional antennas of the first transmission point with the multiple-input-multiple-output (MIMO) capability and the multiple second directional antennas of the second transmission point with the multiple-input-multiple-output (MIMO) capability;

said altering the at least one aspect includes altering the at least one aspect in connection with only the multiple first directional antennas of the first transmission point with the multiple-input-multiple-output (MIMO) capability;

said transmitting the data in connection with the first transmission to the multiple-input-multiple-output (MIMO)-capable portable wireless device includes transmitting the data utilizing the multiple first directional antennas of the first transmission point with the multiple-input-multiple-output (MIMO) capability;

said first directional antennas and the second directional antennas have associated therewith a multiple-input-multiple-output (MIMO) virtual sector including an area where a multiple-input-multiple-output (MIMO) physical sector is to operate;

said first directional antennas and the second directional antennas form multiple-input-multiple-output (MIMO) virtual sectors that are capable of being selected to provide multiple-input-multiple-output (MIMO) physical sectors;

said first directional antennas and the second directional antennas are positioned in fixed positions to form multiple-input-multiple-output (MIMO) virtual sectors that are capable of being selected to communicate using one or more multiple-input-multiple-output (MIMO) physical sectors associated with the multiple-input-multiple-output (MIMO) virtual sectors;

said multiple first directional antennas of the first transmission point with the multiple-input-multiple-output (MIMO) capability include all of the first directional antennas of the first transmission point with the multiple-input-multiple-output (MIMO) capability, the multiple second directional antennas of the second transmission point with the multiple-input-multiple-output (MIMO) capability include all of the second directional antennas of the second transmission point with the multiple-input-multiple-output (MIMO) capability; or said multiple-input-multiple-output (MIMO)-capable portable wireless device includes at least one of a mobile device, a client, a computer, or a hand-held device.

16. A method, comprising:
providing access to a single wireless station configured to operate in a packet-switched cellular network, the single wireless station including:
 a first transmission point with a multiple-input-multiple-output (MIMO) capability, the first transmission point having:
  a plurality of first directional antennas,
  at least one first radio in communication with the first directional antennas, and
  first circuitry in communication with the at least one first radio; and
 a second transmission point with a multiple-input-multiple-output (MIMO) capability, the second transmission point having:
  a plurality of second directional antennas,
  at least one second radio in communication with the second directional antennas, and
  second circuitry in communication with the at least one second radio; and cooperating with a multiple-input-multiple-output (MIMO)-capable portable wireless device including:
 a plurality of mobile device directional antennas,
 at least one mobile device radio in communication with the mobile device directional antennas, and
 mobile device circuitry in communication with the at least one mobile device radio, said multiple-input-multiple-output (MIMO)-capable portable wireless device configured for:
  measuring a first interference in connection with the first transmission point with the multiple-input-multiple-output (MIMO) capability of the single wireless station, utilizing at least one of the mobile device directional antennas, and
  measuring a second interference in connection with the second transmission point with the multiple-input-multiple-output (MIMO) capability of the single wireless station, utilizing at least one of the mobile device directional antennas;
receiving first information from the multiple-input-multiple-output (MIMO)-capable portable wireless device that is based on the measurement of the first interference;
receiving second information from the multiple-input-multiple-output (MIMO)-capable portable wireless device that is based on the measurement of the second interference;
performing beamforming in connection with a first transmission utilizing at least one of: multiple of the first directional antennas of the first transmission point with the multiple-input-multiple-output (MIMO) capability, or multiple of the second directional antennas of the second transmission point with the multiple-input-multiple-output (MIMO) capability, based on the first information and the second information; and
transmitting data in connection with the first transmission to the multiple-input-multiple-output (MIMO)-capable portable wireless device, utilizing the beamforming in connection with at least one of: the multiple first directional antennas of the first transmission point with the multiple-input-multiple-output (MIMO) capability, or the multiple second directional antennas of the second transmission point with the multiple-input-multiple-output (MIMO) capability.

17. The method of claim 16, and further comprising: communicating with the multiple-input-multiple-output (MIMO)-capable portable wireless device utilizing a same channel, utilizing the first transmission point with the multiple-input-multiple-output (MIMO) capability and the second transmission point with the multiple-input-multiple-output (MIMO) capability, where each of the first transmission point with the multiple-input-multiple-output (MIMO) capability and the second transmission point with the multiple-input-multiple-output (MIMO) capability, despite utilizing the same channel, exhibits at least one different channel characteristic that is a function of at least two of: a channel characteristic that is throughput-related, a channel characteristic that is signal-to-noise ratio-related, a channel characteristic that is signal strength-related, or a channel characteristic that is multipath signal-related.

18. A method, comprising:
providing access to a packet-switched cellular network including:
 a plurality of wireless cells each including:
  a first part with a multiple-input-multiple-output (MIMO) capability, the first part having:
   a plurality of first directional antennas, at least one first radio in communication with the first directional antennas, and first circuitry in communication with the at least one first radio; and a second part with a multiple-input-multiple-output (MIMO) capability, the second part having:
a plurality of second directional antennas,
at least one second radio in communication with the second directional antennas, and
second circuitry in communication with the at least one second radio; and a multiple-input-multiple-output (MIMO)-capable portable wireless device including:
a plurality of mobile device directional antennas,
at least one mobile device radio in communication with the mobile device directional antennas, and
mobile device circuitry in communication with the at least one mobile device radio, said multiple-input-multiple-output (MIMO)-capable portable wireless device configured for:
measuring a first interference in connection with the first part with the multiple-input-multiple-output (MIMO) capability of a particular wireless cell, utilizing at least one of the mobile device directional antennas, and
measuring a second interference in connection with the second part with the multiple-input-multiple-output (MIMO) capability of the particular wireless cell, utilizing at least one of the mobile device directional antennas;

receiving first information from the multiple-input-multiple-output (MIMO)-capable portable wireless device that is a function of the measurement of the first interference;

receiving second information from the multiple-input-multiple-output (MIMO)-capable portable wireless device that is a function of the measurement of the second interference;

coordinating utilization of at least one of multiple of the first directional antennas of the first part with the multiple-input-multiple-output (MIMO) capability, or multiple of the second directional antennas of the second part with the multiple-input-multiple-output (MIMO) capability, as a function of the first information and the second information; and communicating data in connection with a first transmission to the multiple-input-multiple-output (MIMO)-capable portable wireless device, utilizing at least one of: the multiple first directional antennas of the first part with the multiple-input-multiple-output (MIMO) capability, or the multiple second directional antennas of the second part with the multiple-input-multiple-output (MIMO) capability.

19. The method of claim 18, wherein a channel between the first part and the multiple-input-multiple-output (MIMO)-capable portable wireless device differs from another channel between the second part and the multiple-input-multiple-output (MIMO)-capable portable wireless device in terms of at least one channel characteristic that includes at least one of: a channel characteristic that is throughput-related, a channel characteristic that is signal-to-noise ratio-related, a channel characteristic that is signal strength-related, or a channel characteristic that is multipath signal-related.

20. The method of claim 18, wherein a channel between the first part and the multiple-input-multiple-output (MIMO)-capable portable wireless device differs from another channel between the second part and the multiple-input-multiple-output (MIMO)-capable portable wireless device in terms of at least two channel characteristics that include at least two of: a channel characteristic that is throughput-related, a channel characteristic that is signal-to-noise ratio-related, a channel characteristic that is signal strength-related, and a channel characteristic that is multipath signal-related.

* * * * *